US011342979B2

(12) United States Patent
Hao et al.

(10) Patent No.: US 11,342,979 B2
(45) Date of Patent: May 24, 2022

(54) SCALABLE PROCESS FOR INDICATING BEAM SELECTION

(71) Applicant: Qualcomm Incorporated, San Diego, CA (US)

(72) Inventors: Chenxi Hao, Beijing (CN); Liangming Wu, Beijing (CN); Yu Zhang, Beijing (CN); Hao Xu, Beijing (CN); Chao Wei, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 16/638,197

(22) PCT Filed: Aug. 10, 2018

(86) PCT No.: PCT/CN2018/099962
§ 371 (c)(1),
(2) Date: Feb. 11, 2020

(87) PCT Pub. No.: WO2019/029702
PCT Pub. Date: Feb. 14, 2019

(65) Prior Publication Data
US 2020/0220603 A1 Jul. 9, 2020

(30) Foreign Application Priority Data

Aug. 11, 2017 (WO) ................ PCT/CN2017/097173

(51) Int. Cl.
*H04B 7/06* (2006.01)
*H04B 7/0456* (2017.01)

(52) U.S. Cl.
CPC ......... *H04B 7/0695* (2013.01); *H04B 7/0478* (2013.01); *H04B 7/0617* (2013.01); *H04B 7/0626* (2013.01)

(58) Field of Classification Search
CPC .................................................... H04B 7/0695
(Continued)

(56) References Cited

U.S. PATENT DOCUMENTS

2009/0021646 A1* 1/2009 Shao .................. H04N 21/2385
348/608
2009/0268827 A1* 10/2009 Clerckx ............... H04B 7/0639
375/260

(Continued)

FOREIGN PATENT DOCUMENTS

| CN | 104660311 A | 5/2015 |
| CN | 106559121 A | 4/2017 |
| CN | 106663860 A | 5/2017 |

OTHER PUBLICATIONS

3GPP TR 38.912 V1.0.0, 3rd Generation Partnership Project; Technical Specification Group Radio Access Network; Study on New Radio (NR) Access Technology, (Release 14), Mar. 2017, pp. 1-74.
(Continued)

*Primary Examiner* — Lihongyu Yu
(74) *Attorney, Agent, or Firm* — QUALCOMM Incorporated

(57) ABSTRACT

Methods, systems, and devices for wireless communication are described. In wireless systems supporting multiple-input, multiple-output (MIMO) transmissions, devices may implement beam-forming to improve reliability of communications. A user equipment (UE) may select a set of beams, and corresponding beam indices, for communication based on reference signals received from a base station. The UE may determine values corresponding to each of the beam indices using a scalable set of tables. For example, the UE may select a subset of the tables based on the number of selected beams, and may determine the values based on these tables. In this way, the UE may efficiently store sets of tables for multiple different configurations. The UE may (Continued)

sum the corresponding values to obtain a combination index value, and may transmit the combination index value to the base station. The base station may determine the selected beams based on this combination index value.

38 Claims, 22 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2013/0039345 | A1 | 2/2013 | Kim et al. |
| 2013/0064129 | A1* | 3/2013 | Koivisto .............. H04B 7/0621 370/252 |
| 2015/0280801 | A1 | 10/2015 | Xin et al. |
| 2016/0142117 | A1 | 5/2016 | Rahman et al. |
| 2017/0047977 | A1* | 2/2017 | Kim ..................... H04B 7/0621 |

OTHER PUBLICATIONS

Giese J., et al., "Application of Coordinated Beam Selection in Heterogeneous LTE-Advanced Networks", 2011 8th International Symposium on Wireless Communication Systems, Nov. 9, 2011, pp. 730-734.

International Search Report and Written Opinion—PCT/CN2017/097173—ISA/EPO—dated May 7, 2018.
International Search Report and Written Opinion—PCT/CN2018/099962—ISA/EPO—dated Nov. 1, 2018.
Nokia et al., "On Procedures for Beam Selection and Feedback Signalling", R1-1612862, 3GPP TSG-RAN WG1#87 Reno, NV, USA, Nov. 18, 2016, 4 Pages.
QUALCOMM: "Beam Management for NR", R1-1708586, 3GPP TSG RAN1 #89 Hangzhou, P.R. China, May 19, 2017, 9 Pages.
Ren Y., et al., "Multiple-Beam Selection With Limited for Hybrid Beamfonning in Massive MIMO Systems", IEEE Access, Feb. 9, 2017, vol. 5, pp. 13327-13335, ISSN: 2169-3536.
ERICSSON: "Encoding and Mapping of CSI Parameters", 3GPP TSG-RAN WG1 #89ah-NR, 3GPP Draft; R1-1711030 Encoding and Mapping of CSI Parameters, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, 4 Pages, Jun. 26, 2017 (Jun. 26, 2017), XP051300230, Retrieved from the Internet: URL: http://www.3gpp.org/ftp/Meetings_3GPP_SYNC/RAN1/Docs/ [retrieved on Jun. 26, 2017] Section 3.
Supplementary European Search Report—EP18845158—Search Authority—Munich—dated Mar. 17, 2021.
Torti F., et al., "Benchmark Testing of Algorithms for Very Robust Regression: FS, LMS and LTS", Computational Statistics and Data Analysis, North-Holland, Amsterdam, NL, vol. 56, No. 8, Feb. 3, 2012 (Feb. 3, 2012), pp. 2501-2512, XP028475307, ISSN: 0167-9473, DOI: 10.1016/J.CSDA.2012.02.003 [retrieved on Feb. 3, 2012] p. 2510.

* cited by examiner

SCALABLE PROCESS FOR INDICATING BEAM SELECTION

CROSS REFERENCES

The present 371 Application for Patent claims priority to International Patent Application No. PCT/CN2018/099962 by HAO et al., entitled "A SCALABLE PROCESS FOR INDICATING BEAM SELECTION," filed Aug. 10, 2018; and to International Patent Application No. PCT/CN2017/097173 to HAO et al., entitled "A SCALABLE PROCESS FOR INDICATING BEAM SELECTION," filed Aug. 11, 2017, each of which is assigned to the assignee hereof.

BACKGROUND

The following relates generally to wireless communication, and more specifically to a scalable process for indicating beam selection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support the use of linear combination codebooks (e.g., to support multiple-input, multiple-output (MIMO) communications). MIMO communications may rely on transmissions of reference signals (e.g., channel state information (CSI) reference signals (CSI-RS)) over one or more antenna ports. The linear combination codebook may enable a device to select a linear combination of beams for communication. However, to indicate the selected beams, a device may perform an exhaustive lookup process, which may greatly increase latency. Additionally, if the device utilizes a lookup table for determining an indication of the selected beams, the device may have to store separate lookup tables for different configurations of beams L and dimensions $N_1$ and $N_2$. This may result in a heavy burden on memory storage resources.

SUMMARY

The described techniques relate to improved methods, systems, devices, or apparatuses that support a scalable process for indicating beam selection. Generally, the described techniques provide for generating an indication of selected beams using a scalable set of tables stored in memory. In wireless systems supporting multiple-input, multiple-output (MIMO) transmissions, devices may implement beam-forming to improve reliability of communications. A user equipment (UE) may select a set of beams, and corresponding beam indices, for communication (e.g., based on a configuration of a number of antenna ports or reference signals received from a base station). The UE may determine values corresponding to each of the beam indices using a scalable set of tables. For example, the UE may select a subset of the tables based on the number of selected beams, and may determine the values corresponding to the beam indices based on these tables. In this way, the UE may efficiently store sets of tables for multiple different configurations (e.g., based on a number of selected beams, a size of dimensions, etc.). The UE may sum the corresponding values to obtain a combination index value, and may transmit the combination index value to the base station. The base station may determine the selected beams based on this combination index value and a similar scalable set of tables stored in its memory.

A method of wireless communication is described. The method may include identifying a set of selected beams for reporting to a base station, determining a first value associated with a first beam index of a set of beam indices, the first value corresponding to a first index value of a first table, wherein the set of beam indices comprises a number of beam indices equal to a number of selected beams of the set of selected beams, and determining an additional value associated with one or more additional beam indices of the set of beam indices based at least in part on one or more additional tables. Additionally, the method may include summing the first value and one or more of the additional values to determine a combination index value, and transmitting, to the base station, the combination index value indicating the set of selected beams.

An apparatus for wireless communication is described. The apparatus may include means for identifying a set of selected beams for reporting to a base station, means for determining a first value associated with a first beam index of a set of beam indices, the first value corresponding to a first index value of a first table, wherein the set of beam indices comprises a number of beam indices equal to a number of selected beams of the set of selected beams, and means for determining an additional value associated with one or more additional beam indices of the set of beam indices based at least in part on one or more additional tables. Additionally, the apparatus may include means for summing the first value and one or more of the additional values to determine a combination index value, and means for transmitting, to the base station, the combination index value indicating the set of selected beams.

Another apparatus for wireless communication is described. The apparatus may include a processor, memory in electronic communication with the processor, and instructions stored in the memory. The instructions may be operable to cause the processor to identify a set of selected beams for reporting to a base station, determine a first value associated with a first beam index of the set of beam indices, the first value corresponding to a first index value of a first table, wherein the set of beam indices comprises a number of beam indices equal to a number of selected beams of the set of selected beams, and determine an additional value associated with one or more additional beam indices of the set of beam indices based at least in part on one or more additional tables. Additionally, the instructions may be operable to cause the processor to sum the first value and one or more of the additional values to determine a combination index value, and transmit, to the base station, the combination index value indicating the set of selected beams.

A non-transitory computer readable medium for wireless communication is described. The non-transitory computer-readable medium may include instructions operable to cause a processor to identify a set of selected beams for reporting to a base station, determine a first value associated with a first beam index of a set of beam indices, the first value corresponding to a first index value of a first table, wherein the set of beam indices comprises a number of beam indices equal to a number of selected beams of the set of selected beams, and determine an additional value associated with one or more additional beam indices of the set of beam indices based at least in part on one or more additional tables. Additionally, the instructions may be operable to cause the processor to sum the first value and one or more of the additional values to determine a combination index value, and transmit, to the base station, the combination index value indicating the set of selected beams.

Some examples of the method, apparatus, and non-transitory computer-readable medium described above may further include processes, features, means, or instructions for receiving a configuration of a codebook type for a codebook for reporting channel state information (CSI). Some examples of the method, apparatus, and non-transitory computer-readable medium described above may further include processes, features, means, or instructions for receiving, from the base station, a set of reference signals associated with one or more antenna ports of the base station, and identifying the set of beam indices based at least in part on the codebook type and/or at least one of the set of reference signals or the one or more antenna ports. In some examples, the identified set of beam indices correspond to codeword indices of the codebook if the configured codebook type comprises a beam selection codebook or to antenna port indices if the configured codebook type comprises a port selection codebook. In some examples of the method, apparatus, and non-transitory computer-readable medium described above, the set of reference signals may be received in beam-formed or non-beam-formed transmissions. In some examples of the method, apparatus, and non-transitory computer-readable medium described above, each codeword of the beam selection codebook may be an example of a base sequence, and the beam selection codebook may include one or more sets of orthogonal base sequences.

In some examples of the method, apparatus, and non-transitory computer-readable medium described above, the first value may be equal to the first beam index. In some examples of the method, apparatus, and non-transitory computer-readable medium described above, each additional beam index of the set of beam indices increases in an ascending order with respect to a previous additional beam index.

In some examples of the method, apparatus, and non-transitory computer-readable medium described above, the additional value for one or more additional beam indices may be based at least in part on a current table of the one or more additional tables. Some examples of the method, apparatus, and non-transitory computer-readable medium described above may further include processes, features, means, or instructions for identifying, from the current table, an input value associated with an additional beam index of the set of beam indices, wherein the additional value may be equal to the input value.

In some examples of the method, apparatus, and non-transitory computer-readable medium described above, the additional value for one or more additional beam indices may be based at least in part on a preceding table and a current table of the one or more additional tables. Some examples of the method, apparatus, and non-transitory computer-readable medium described above may further include processes, features, means, or instructions for identifying a preceding beam index that may be one less than an additional beam index of the set of beam indices. Some examples of the method, apparatus, and non-transitory computer-readable medium described above may further include processes, features, means, or instructions for identifying, from the preceding table, a first input value associated with the preceding beam index. Some examples of the method, apparatus, and non-transitory computer-readable medium described above may further include processes, features, means, or instructions for identifying, from the current table, a second input value associated with the preceding beam index. Some examples of the method, apparatus, and non-transitory computer-readable medium described above may further include processes, features, means, or instructions for summing the first input value and the second input value to obtain the additional value for the additional beam index.

In some examples of the method, apparatus, and non-transitory computer-readable medium described above, a set of values stored in each of the one or more additional tables may be based at least in part on a preceding set of values stored in a preceding table of the first table or the one or more additional tables. In some examples of the method, apparatus, and non-transitory computer-readable medium described above, a value of the set of values may be the sum of a preceding value of the set of values and a preceding table value of the preceding set of values, wherein the preceding value and the preceding table value may be associated with a same beam index.

In some examples of the method, apparatus, and non-transitory computer-readable medium described above, each table of the first table and the one or more additional tables may have a same length and wherein a number of active entries for each table may be based at least in part on a configured number of antenna ports, a configured number of beams, or a combination thereof.

Some examples of the method, apparatus, and non-transitory computer-readable medium described above may further include processes, features, means, or instructions for receiving a first configuration from the base station indicating a first configured number of antenna ports, configured number of beams, or combination thereof. Some examples of the method, apparatus, and non-transitory computer-readable medium described above may further include processes, features, means, or instructions for selecting a first set of active entries for each table of the first table and the one or more additional tables based at least in part on the first configured number of antenna ports, configured number of beams, or combination thereof. Some examples of the method, apparatus, and non-transitory computer-readable medium described above may further include processes, features, means, or instructions for receiving a second configuration from the base station indicating a second configured number of antenna ports, configured number of beams, or combination thereof, wherein the second configured number of antenna ports, configured number of beams, or combination thereof may be greater than the first configured number of antenna ports, configured number of beams, or combination thereof. Some examples of the method, apparatus, and non-transitory computer-readable medium described above may further include processes, features, means, or instructions for selecting a second set of active entries for each table of the first table and the one or more additional tables based at least in part on the second configured number of antenna ports, configured number of beams, or combination thereof, wherein the first set of active entries may be a subset of the second set of active entries.

In some examples of the method, apparatus, and non-transitory computer-readable medium described above, a number of active entries may be based at least in part on a configured number of antenna ports transmitting channel state information reference signals (CSI-RS), a configured number of beams, or a combination thereof.

Some examples of the method, apparatus, and non-transitory computer-readable medium described above may further include processes, features, means, or instructions for receiving a configuration from the base station indicating a configured number of beams for selection, wherein the number of selected beams equals the configured number of beams for selection, and selecting the set of beam indices based at least in part on the configured number of beams for selection. In some examples of the method, apparatus, and non-transitory computer-readable medium described above, the configured number of beams for selection is based at least in part on a configuration of a number of antenna ports.

Some examples of the method, apparatus, and non-transitory computer-readable medium described above may further include processes, features, means, or instructions for receiving a first configuration from the base station indicating the configured number of beams for selection. Some examples of the method, apparatus, and non-transitory computer-readable medium described above may further include processes, features, means, or instructions for selecting a first set of tables comprising a number of tables equal to the configured number of beams for selection, wherein determining the first value and one or more additional values may be based at least in part on the first set of tables. Some examples of the method, apparatus, and non-transitory computer-readable medium described above may further include processes, features, means, or instructions for receiving a second configuration from the base station indicating a second configured number of beams for selection that may be greater than the configured number of beams for selection. Some examples of the method, apparatus, and non-transitory computer-readable medium described above may further include processes, features, means, or instructions for selecting a second set of tables comprising a second number of tables equal to the second configured number of beams for selection, wherein the first set of tables may be a subset of the second set of tables.

Some examples of the method, apparatus, and non-transitory computer-readable medium described above may further include processes, features, means, or instructions for identifying a beam index of the set of beam indices. In some examples of the method, apparatus, and non-transitory computer-readable medium described above, identifying the beam index of the set of beam indices comprises identifying a first sub-beam index corresponding to a first dimension. Some examples of the method, apparatus, and non-transitory computer-readable medium described above may further include processes, features, means, or instructions for identifying a second sub-beam index corresponding to a second dimension. Some examples of the method, apparatus, and non-transitory computer-readable medium described above may further include processes, features, means, or instructions for calculating the beam index based at least in part on the first sub-beam index and the second sub-beam index.

In some examples of the method, apparatus, and non-transitory computer-readable medium described above, calculating the beam index further comprises multiplying the first sub-beam index with a size of the second dimension to obtain an intermediate value. Some examples of the method, apparatus, and non-transitory computer-readable medium described above may further include processes, features, means, or instructions for adding, to the intermediate value, the second sub-beam index to obtain the beam index.

Some examples of the method, apparatus, and non-transitory computer-readable medium described above may further include processes, features, means, or instructions for selecting one or more beams from a codebook based at least in part on the set of reference signals, wherein identifying the set of beam indices may be based at least in part on the selected one or more beams. In some examples of the method, apparatus, and non-transitory computer-readable medium described above, the codebook used for the selecting may be based at least in part on a configuration of a number of antenna ports.

A method of wireless communication is described. The method may include receiving, from a UE, a combination index value indicating a set of selected beams, determining a greatest beam index for a first selected beam of the set of selected beams based at least in part on a current table and the combination index value, and determining an additional beam index for each additional selected beam of the set of selected beams based at least in part on one or more additional tables and an updated combination index value.

An apparatus for wireless communication is described. The apparatus may include means for receiving, from a UE, a combination index value indicating a set of selected beams, means for determining a greatest beam index for a first selected beam of the set of selected beams based at least in part on a current table and the combination index value, and means for determining an additional beam index for each additional selected beam of the set of selected beams based at least in part on one or more additional tables and an updated combination index value.

Another apparatus for wireless communication is described. The apparatus may include a processor, memory in electronic communication with the processor, and instructions stored in the memory. The instructions may be operable to cause the processor to receive, from a UE, a combination index value indicating a set of selected beams, determine a greatest beam index for a first selected beam of the set of selected beams based at least in part on a current table and the combination index value, and determine an additional beam index for each additional selected beam of the set of selected beams based at least in part on one or more additional tables and an updated combination index value.

A non-transitory computer readable medium for wireless communication is described. The non-transitory computer-readable medium may include instructions operable to cause a processor to receive, from a UE, a combination index value indicating a set of selected beams, determine a greatest beam index for a first selected beam of the set of selected beams based at least in part on a current table and the combination index value, and determine an additional beam index for each additional selected beam of the set of selected beams based at least in part on one or more additional tables and an updated combination index value.

Some examples of the method, apparatus, and non-transitory computer-readable medium described above may further include processes, features, means, or instructions for transmitting, to the UE, a configuration of a codebook type for a codebook for CSI reporting. Some examples of the method, apparatus, and non-transitory computer-readable medium described above may further include processes, features, means, or instructions for transmitting, to the UE, a set of reference signals associated with one or more antenna ports. In some examples of the method, apparatus, and non-transitory computer-readable medium described above, the set of reference signals may be transmitted in beam-formed or non-beam-formed transmissions.

In some examples of the method, apparatus, and non-transitory computer-readable medium described above, the greatest beam index and the additional beam index for each additional selected beam of the set of selected beams correspond to codeword indices of the codebook if the configured codebook type comprises a beam selection codebook or to antenna port indices if the configured codebook type comprises a port selection codebook. In some examples of the method, apparatus, and non-transitory computer-readable medium described above, each codeword of the beam selection codebook may be an example of a base, and the beam selection codebook includes one or more sets of orthogonal bases.

In some examples of the method, apparatus, and non-transitory computer-readable medium described above, each additional beam index decreases in a descending order with respect to a previous additional beam index.

In some examples of the method, apparatus, and non-transitory computer-readable medium described above, determining the greatest beam index for the first selected beam further comprises identifying a greatest value of the current table that may be less than or equal to the combination index value, wherein the greatest beam index may be set to an index corresponding to the identified greatest value. Some examples of the method, apparatus, and non-transitory computer-readable medium described above may further include processes, features, means, or instructions for updating the combination index value by subtracting the identified greatest value from the combination index value.

In some examples of the method, apparatus, and non-transitory computer-readable medium described above, determining the additional beam index for each additional selected beam further comprises identifying an additional greatest value of a next table of the one or more additional tables that may be less than or equal to the updated combination index value, wherein the additional beam index may be set to an additional index corresponding to the identified additional greatest value. Some examples of the method, apparatus, and non-transitory computer-readable medium described above may further include processes, features, means, or instructions for updating the updated combination index value by subtracting the identified additional greatest value from the updated combination index value.

In some examples of the method, apparatus, and non-transitory computer-readable medium described above, a smallest beam index for a last selected beam of the set of selected beams may be equal to a last updated combination index value.

In some examples of the method, apparatus, and non-transitory computer-readable medium described above, the current table and the one or more additional tables may be selected from a set of tables stored in a memory. In some examples of the method, apparatus, and non-transitory computer-readable medium described above, the set of tables comprises a first table and one or more subsequent tables, wherein a set of values stored in each of the one or more subsequent tables may be based at least in part on a preceding set of values stored in a preceding table of the set of tables. In some examples of the method, apparatus, and non-transitory computer-readable medium described above, a value of the set of values may be the sum of a preceding value of the set of values and a preceding table value of the preceding set of values, wherein the preceding value and the preceding table value may be associated with a same beam index.

Some examples of the method, apparatus, and non-transitory computer-readable medium described above may further include processes, features, means, or instructions for selecting a first set of tables comprising a number of tables equal to a number of the set of selected beams, wherein determining the greatest beam index and the additional beam index for each additional selected beam may be based at least in part on the first set of tables. Some examples of the method, apparatus, and non-transitory computer-readable medium described above may further include processes, features, means, or instructions for receiving, from the UE, a second combination index value indicating a second set of selected beams, wherein a number of the second set of selected beams may be greater than the number of the set of selected beams. Some examples of the method, apparatus, and non-transitory computer-readable medium described above may further include processes, features, means, or instructions for selecting a second set of tables comprising a second number of tables equal to the number of the second set of selected beams, wherein the first set of tables may be a subset of the second set of tables.

In some examples of the method, apparatus, and non-transitory computer-readable medium described above, each table of a set of tables stored in memory comprises a same length and wherein a number of active entries for each table may be based at least in part on a configured number of antenna ports, a configured number of beams, or a combination thereof.

Some examples of the method, apparatus, and non-transitory computer-readable medium described above may further include processes, features, means, or instructions for identifying a first configured number of antenna ports, configured number of beams, or combination thereof. Some examples of the method, apparatus, and non-transitory computer-readable medium described above may further include processes, features, means, or instructions for selecting a first set of active entries for each table of a set of tables stored in memory based at least in part on the first configured number of antenna ports, configured number of beams, or combination thereof. Some examples of the method, apparatus, and non-transitory computer-readable medium described above may further include processes, features, means, or instructions for identifying a second configured number of antenna ports, configured number of beams, or combination thereof, wherein the second configured number of antenna ports, configured number of beams, or combination thereof may be greater than the first configured number of antenna ports, configured number of beams, or combination thereof. Some examples of the method, apparatus, and non-transitory computer-readable medium described above may further include processes, features, means, or instructions for selecting a second set of active entries for each table of the set of tables based at least in part on the second configured number of antenna ports, configured number of beams, or combination thereof, wherein the first set of active entries may be a subset of the second set of active entries.

In some examples of the method, apparatus, and non-transitory computer-readable medium described above, each table of a set of tables stored in memory comprises a number of active entries based at least in part on a configured number of antenna ports transmitting CSI-RS, a configured number of beams, or a combination thereof.

Some examples of the method, apparatus, and non-transitory computer-readable medium described above may further include processes, features, means, or instructions for calculating, for a beam index, a first sub-beam index corresponding to a first dimension and a second sub-beam index corresponding to a second dimension. In some examples of the method, apparatus, and non-transitory computer-readable medium described above, calculating the first sub-beam index comprises dividing the beam index by a size of the second dimension to obtain an intermediate value. Some examples of the method, apparatus, and non-transitory computer-readable medium described above may further include processes, features, means, or instructions for rounding the intermediate value down to the nearest integer to obtain the first sub-beam index. In some examples of the method, apparatus, and non-transitory computer-readable medium described above, calculating the second sub-beam index comprises dividing the beam index by a size of the second dimension to obtain the second sub-beam index, wherein the second sub-beam index may be a remainder of the division.

Some examples of the method, apparatus, and non-transitory computer-readable medium described above may further include processes, features, means, or instructions for identifying the set of selected beams based at least in part on a codebook and the greatest beam index and each additional beam index. In some examples of the method, apparatus, and non-transitory computer-readable medium described above, the codebook used for the identifying may be based at least in part on a configuration of a number of antenna ports.

DETAILED DESCRIPTION

Figure 1:
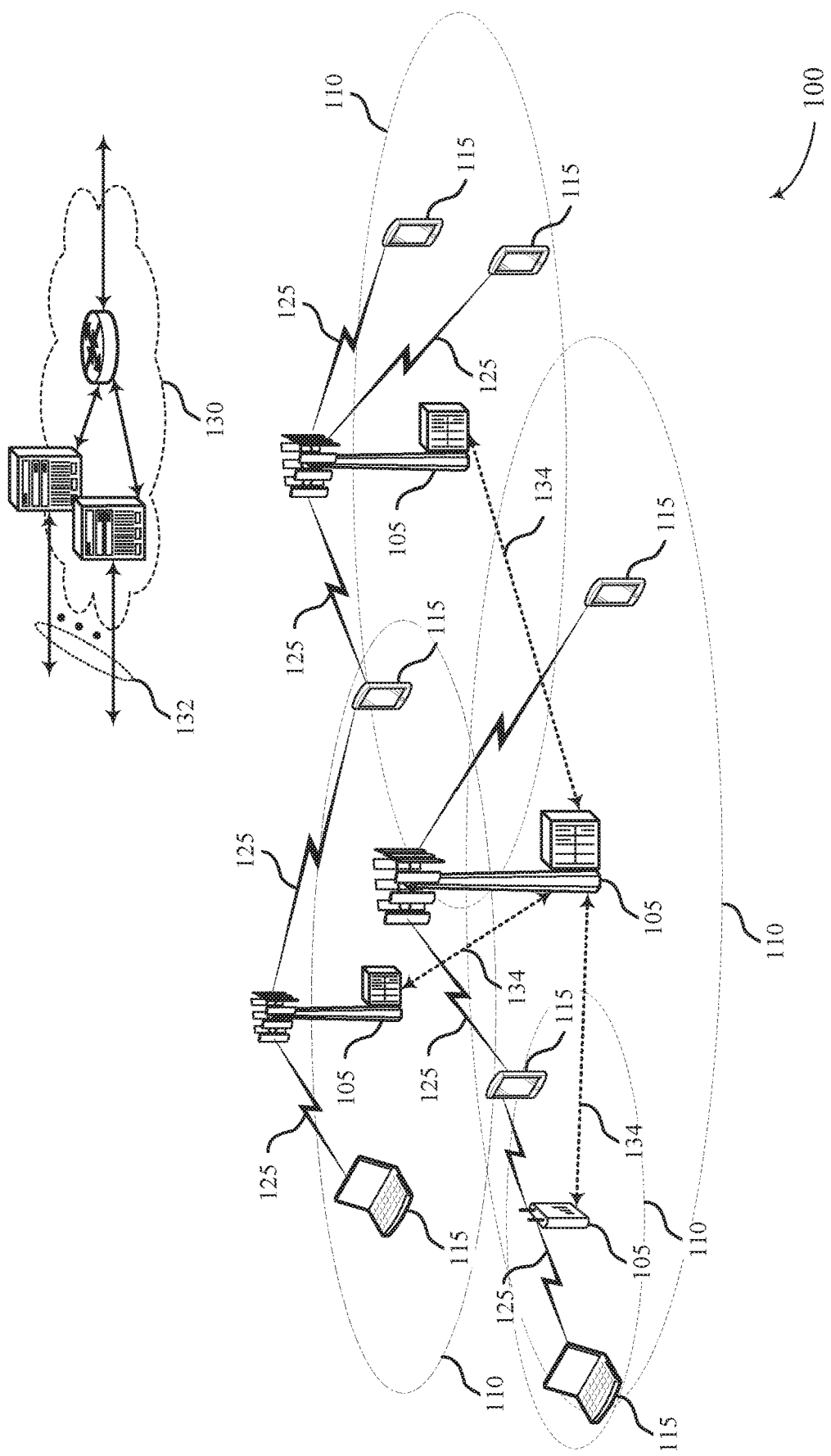
FIG. 1 illustrates an example of a system for wireless communication that supports a scalable process for indicating beam selection in accordance with aspects of the present disclosure.

In some wireless systems (e.g., a new radio (NR) system), wireless devices may support multiple-input, multiple-output (MIMO) transmissions. MIMO transmissions may refer to transmission of signals from antenna elements of a transmitting device such that the signals coherently combine at antenna elements of a receiving device, which may be referred to as receive diversity. Such transmissions may improve the reliability of the communications (e.g., may boost a signal to noise ratio (SNR), reduce a block error rate, etc.). In some cases, MIMO operations may employ beam-forming, which is a signal processing technique that may be used to shape an antenna beam. Beam-forming may be achieved by combining antenna elements of an antenna array such that signals propagating at particular orientations with respect to the array experience constructive interference while others experience destructive interference.

To support MIMO transmissions and beam-forming, a base station may use one or more antenna ports to transmit reference signals to a user equipment (UE) for channel estimation. The UE may select a set of beams for communication based on the configuration of antenna ports or based on the received reference signals. In order to indicate the selected beams to the base station, the UE may implement a beam selection indication process. The UE may determine beam indices based on the selected beams, and may order the beam indices in ascending order. The UE may select a subset of tables from a set of scalable tables stored in its memory. For example, the UE may select the first L tables of the set of scalable tables, where L is the number of beams selected for MIMO transmission. Additionally, the UE may use a subset of active entries within the selected tables to determine a value corresponding to each of the beam indices. The UE may search the selected tables of the corresponding values, and may sum the values to obtain a combination index value. The UE may transmit this combination index value to the base station to indicate the selected beams.

The base station may receive the combination index value, and may determine the selected beams based on this combination index value. For example, the base station may also select a subset of tables and entries from a corresponding set of scalable tables stored in its memory. The base station may iteratively determine each beam index indicated by the combination index value in descending order by using the selected subset of tables. The base station may then determine the beams corresponding to the beam indices (e.g., using a codebook). The scalable set of tables may allow the UE and base station to efficiently store the tables for multiple different configurations (e.g., based on a number of selected beams, a size of dimensions, etc.). Additionally, the scalable set of tables may improve the latency associated with generating the combination index value.

Aspects of the disclosure are initially described in the context of wireless communications systems. Aspects of the disclosure are then presented with respect to a scalable set of tables and process flows. Aspects of the disclosure are further illustrated by and described with reference to apparatus diagrams, system diagrams, and flowcharts that relate to a scalable process for indicating beam selection.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or an NR network. In some cases, wireless communications system 100 may support enhanced broadband communications, ultra-reliable (e.g., mission critical) communications, low latency communications, or communications with low-cost and low-complexity devices. In some cases, a base station 105 may transmit one or more reference signals to a UE 115, and the UE 115 may select a set of beams based on the reference signals. The UE 115 may indicate the selected set of beams to the base station 105 using a combination index value, which may be efficiently determined using a scalable set of tables.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an SI or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless systems (e.g., systems implementing MIMO transmissions), a base station 105 may transmit a set of reference signals, such as channel state information (CSI) reference signals (CSI-RS), to a UE 115. The UE 115 may receive the reference signals and determine a channel quality associated with one or more of the reference signals. Based on the channel quality, the UE 115 may select a set of beams for communication with the base station 105. To indicate this selected set of beams to the base station 105, the UE 115 may generate a combination index value, and may transmit the combination index value to the base station 105. The base station 105 may determine the indicated set of beams based on the combination index value (e.g., using a codebook).

Figure 2:
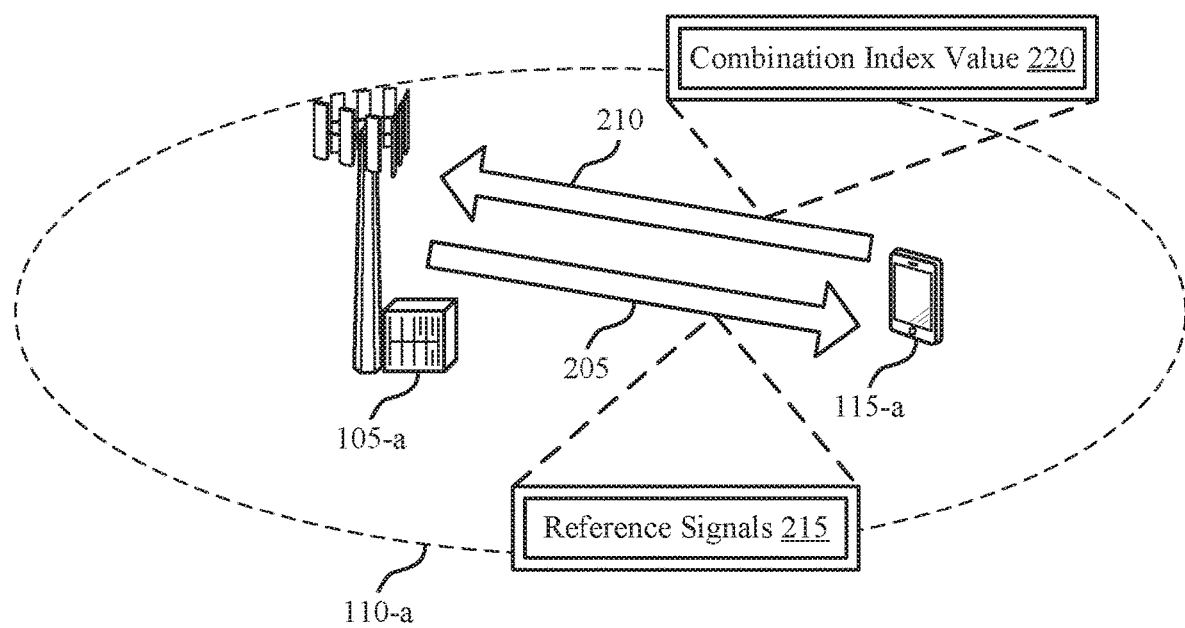
FIG. 2 illustrates an example of a wireless communication system that supports a scalable process for indicating beam selection in accordance with aspects of the present disclosure.

FIG. 2 illustrates an example of a wireless communication system 200 that supports a scalable process for indicating beam selection in accordance with various aspects of the present disclosure. The wireless communication system 200 may include UE 115-a, base station 105-a, and corresponding geographic coverage area 110-a, which may be examples of the devices and areas described with respect to FIG. 1. Base station 105-a and UE 115-a may communicate using downlink signals 205 and uplink signals 210. In some cases, base station 105-a may transmit one or more reference signals 215 to UE 115-a using one or more antenna ports. UE 115-a may select one or more beams for transmission based on the received reference signals 215, the one or more antenna ports, or both, and may calculate a combination index value 220 based on the selected beams and a scalable process for indicating the selected beams. UE 115-a may then transmit the combination index value 220 to base station 105-a to indicate the selected beams.

In some wireless systems (e.g., an NR system), UE 115-a and base station 105-a may support MIMO transmissions. MIMO transmissions may refer to the transmission of signals from antenna elements of a transmitting device such that the signals coherently combine at antenna elements of a receiving device (i.e., which may be referred to as receive diversity). Such transmissions may improve the reliability of the communications (e.g., may boost an SNR, reduce a block error rate, etc.). Additionally or alternatively, MIMO transmissions may employ spatial multiplexing in which multiple parallel data streams are transmitted over distinct spatial layers. Spatial multiplexing depends on the correlation between the transmitted beams. If signals of two transmitted beams experience similar multipath effects, the received versions of the signals may be highly correlated and the available spatial multiplexing gain may be relatively low (e.g., non-existent). However, in a rich multipath environment, spatial multiplexing may significantly boost system throughput.

MIMO operations may employ beam-forming, which is a signal processing technique that may be used to shape an antenna beam. Beam-forming may be achieved by combining antenna elements of an antenna array such that signals propagating at particular orientations with respect to the array experience constructive interference while others experience destructive interference. Amplitude and phase offsets may be applied to the antenna elements through the use of precoding applied over antenna ports to generate a desired interference pattern. Precoding may be defined by a beam-forming weight set associated with a particular orientation.

To support MIMO communications, base station 105-a may transmit reference signals 215 (e.g., CSI-RS) over multiple antenna ports, where each antenna port is associated with one or more physical antennas (e.g., which may refer to a combination of antenna elements in an antenna array). These transmissions may or may not be examples of beam-formed transmissions. For example, base station 105-a may have an antenna array with a number of rows and columns of antenna ports that the base station 105-a may use to support beamforming of communications with a UE 115. Likewise, a UE 115 (e.g., UE 115-a) may have one or more antenna arrays that may support various MIMO or beam-forming operations. By way of example, an antenna array (e.g., or antenna panel) may be or include a set of antenna elements connected to the same digital transceiver chain. An antenna array (e.g., or antenna panel) may include analog phase control circuitry that beamforms transmissions from the array or panel. UE 115-a receiving some or all of the reference signals 215 may perform channel measurements to determine characteristics of the communication environment. For example, upon receiving the reference signals 215, UE 115-a may estimate the channel between itself and base station 105-a and generate a CSI report based on the estimate.

UE 115-a, base station 105-a, or both may implement a linear combination codebook (e.g., in conjunction with a CSI report for a number of beams or a number of antenna ports). In some cases, the linear combination codebook may be a beam selection codebook (also referred to as a Type II codebook). A Type II codebook may use non-precoded reference signals 215 (e.g., CSI-RSs). The Type II codebook may include a set of orthogonal base sequences, or may include a set of discrete Fourier transform (DFT) base sequences. Each of these codewords may correspond to a codeword or a beam index. In some cases, the linear combination codebook may be a port selection codebook (also referred to as a Type II port selection codebook). A Type II port selection codebook may use precoded reference signals (e.g., CSI-RSs). UE 115-a may receive a configuration indicating use of the Type III codebook (e.g., from base station 105-a) and may identify a combination of beams to be communicated to base station 105-a in a CSI report based on the non-precoded reference signals 215. Alternatively, UE 115-a may receive a configuration indicating use of the Type II port selection codebook and may identify a combination of antenna ports to be communicated to base station 105-a in the CSI report based on the precoded reference signals 215. That is, because the reference signals (e.g., CSI-RSs) are precoded, each antenna port may correspond to a respective beam, and UE 115-a may use the one-to-one correspondence between antenna ports and beams to perform channel estimation. Thus, in aspects of the present disclosure a number of beams may be used to refer to a number of beams in conjunction with a Type II codebook and/or a number of antenna ports in conjunction with a Type II port selection codebook. Similarly, beam indices may refer to beam indices or codeword indices with respect to the Type II codebook and/or antenna port indices with respect to the Type II port selection codebook.

UE 115-a may identify one or more beams (e.g., beams or antenna ports, as discussed above) for the linear combination codebook that match the channel estimates (e.g., the channel estimates determined based on the reference signals received from the set of antenna ports). For example, UE 115-a may estimate the raw (unprecoded) channel (e.g., H) and may use the channel estimates based on the reference signals 215 and the antenna ports to identify a set of beams (e.g., corresponding to beams of a codebook) which contribute to a preceding vector for one or more spatial layers.

For each of the one or more spatial layers, UE 115-a may report CSI feedback indicating a linear combination of a subset of pre-coding vectors or matrices in a given pre-coding codebook. As an example, for each spatial layer, the precoding matrix may be given $$\text{by } \begin{bmatrix} w_{0,l} \\ w_{1,l} \end{bmatrix}$$

by where $w_{r,l}$ is the precoder on the $r^{th}$ polarization for the $l^{th}$ layer. The precoding vector $w_{r,l}$ may be obtained by a linear combination (i.e., a weighted sum) of transmit beams. For example:

$$w_{r,l} = \sum_{i=0}^{L-1} b_{k_1^{(i)}, k_2^{(i)}} \times p_{r,l,i}^{WB} \times p_{r,l,i}^{SB} \times c_{r,l,i} \quad (1)$$

where L is the number of beams for which UE 115-$a$ is configured to report CSI feedback, $b_{k_1^{(i)}, k_2^{(i)}}$ is a two-dimensional discrete Fourier transform (2D-DFT) beam, and $p_{r,l,i}^{WB} \times p_{r,l,i}^{SB} \times c_{r,l,i}$ represents the weight of the $i^{th}$ beam of the $l^{th}$ layer. In this equation, $p_{r,l,i}^{WB}$ is the wideband beam amplitude, which may be drawn from a finite set (e.g., $\{1, \sqrt{0.5}, \sqrt{0.25}, \sqrt{0.125}, \sqrt{0.0625}, \sqrt{0.0313}, \sqrt{0.0156}, 0\}$); $p_{r,l,i}^{SB}$ is the sub-band beam amplitude, which may be drawn from another finite set (e.g., $\{1, \sqrt{0.5}\}$); and $c_{r,l,i}$ is the sub-band beam phase, which may be drawn from a third finite set (e.g., $\{e^{j\pi n/2}, n=0, 1, 2, 3\}$ or $\{e^{j\pi n/4}, n=0, 1, 2, \ldots, 7\}$). It is to be understood that equation 1 is included as an example, and other equations for the precoding matrix may be used, where these equations may similarly be based on any combination of the configured number of beams, 2D-DFT beams, beam weights, beam amplitudes, or beam phases.

Base station 105-$a$ (e.g., or some other suitable network entity) may configure the number of beams L and the number of antenna ports in first and second directions or dimensions ($N_1$, $N_2$). That is, to configure the number of beams or antenna ports, base station 105-$a$ may in some cases transmit a configuration message to UE 115-$a$ indicating the number of beams or antenna ports. In some cases, this may be further based on the codebook configuration. For example, for a Type II codebook, UE 115-$a$ may select L beams out of a total $N_1 * N_2$ beams from the beam set (e.g., a DFT beam set). Alternatively, for a Type II port selection codebook, UE 115-$a$ may select L antenna ports out of $P_{CSI-RS}/2$ antenna ports, where $P_{CSI-RS}$ is the total number of reference signal (e.g., CSI-RS) antenna ports. In some cases, base station 105-$a$ may also configure an oversampling ratio for each direction ($O_1$, $O_2$). For example, the number of antenna ports and the oversampling ratio may be configured in the case that the reference signals 215 are not beamformed (e.g., but may not be used in the case of beamformed reference signals 215, which may only require a configuration of the number of beams/antenna ports L). In this way, the configuration of the number of beams may be associated with (i.e., based on) the configuration of the number of antenna ports L. The feedback payload for the linear combination codebook may in some cases include 2L sets of coefficients for each spatial layer (e.g., for L beams each with 2 polarizations). Accordingly, the codebook may also be based on the configuration of the number of beams/antenna ports L.

To report the selected beams, UE 115-$a$ may use $$\left\lceil \log_2 \binom{N_1 N_2}{L} \right\rceil$$

bits. For example, if base station 105-$a$ configures UE 115-$a$ to select from four beams in two dimensions of size four each (i.e., L=4 and $N_1=N_2=4$), there may be 1820 possible different combinations of beams for those dimensions. In such an example, UE 115-$a$ may use an 11 bit combination index value 220 to indicate the selected beams. However, in other examples that support more selected beams (e.g., in a system supporting rank 8 transmissions) or larger dimensions, UE 115-$a$ may select from even more possible combinations, and correspondingly even more combination index values 220. If UE 115-$a$, base station 105-$a$, or both implement a simple lookup table for determining the combination index value 220, the devices may use a different lookup table for each value of $N_1$, $N_2$, and L, and each lookup table may be very large and inefficient. For example, in the above example, UE 115-$a$ and base station 105-$a$ may perform an exhaustive search, which in a worst case may utilize 1819 comparison operations to determine the combination index value 220 for the selected beams.

According to various aspects, UE 115-$a$ or base station 105-$a$ may implement a set of tables scalable with $N_1$, $N_2$, L, or some combination of these parameters. For example, base station 105-$a$ and UE 115-$a$ may include indications of maximum supported values for $N_1$, $N_2$, and L for the wireless network, which may be referred to as $N_{1,max}$, $N_{2,max}$, and $L_{max}$, respectively. Base station 105-$a$ and UE 115-$a$ may store $L_{max}$ tables, and each table may include a number of entries up to $N_{1,max} \times N_{2,max}$. In some cases, the tables may be generated or computed offline, and may be stored at base station 105-$a$ or UE 115-$a$ during a setup or initialization procedure for the wireless device. When UE 115-$a$ is configured for a specific number of beams or a specific size of dimensions, or when UE 115-$a$ receives reference signals 215, UE 115-$a$ may select a subset of tables and entries for determining the combination index value 220. For example, if configured for L=2, $N_1=3$, and $N_2=3$, UE 115-$a$ may utilize the first two tables of the total set of tables. Additionally, in this example eight (8) entries of the first two tables are active entries (e.g., having beam indexes from 0 to $N_1 \times N_2-2$ for the first table and beam indexes from 1 to $N_1 \times N_2-1$ for the second table). In another example, UE 115-$a$ may be configured for L=4, $N_1=4$, and $N_2=4$. In such an example, UE 115-$a$ may select the first four tables, where the first two tables are the same as in the previous L=2 example. Additionally, a number of entries equal to $N_1 N_2-(L-1)$ in each of the four selected tables are active entries (e.g., for a given table m from table 0 to table L-1, beam indexes from m to $N_1 N_2-(L-m)$ may be active). Based on the configuration (e.g., the configuration of the number of antenna ports, the configuration of the number of beams, etc.), base station 105-$a$ may similarly select the same subset of tables and subset of active entries.

UE 115-$a$ may utilize the selected subset of tables and active entries to determine the combination index value 220. UE 115-$a$ may determine a beam index for each selected beam, for example, based on sub-beam indices associated with each dimension or direction (e.g., $N_1$ and $N_2$). UE 115-$a$ may order the determined beam indices in ascending order, and may associate each beam index with a corresponding table of the selected subset of tables (i.e., the first beam index with the first table, the second beam index with the second table, etc.). For each beam index, UE 115-$a$ may search the associated table for the entry with that beam index, and may determine the corresponding value. For example, in the first table, each beam index may correspond to a value that is equal to that beam index. However, for the subsequent tables, the values corresponding to each beam index may be based on a pattern or formula. For example, for a given beam index $i_l$ in table m, the corresponding value may be equal to the sum of the value for beam index $i_{l-1}$ in table m and beam index $i_{l-1}$ in table m−1. UE 115-*a* may determine the value corresponding to each beam index, and may sum the values to determine the combination index value 220 for transmission.

UE 115-*a* may transmit the combination index value 220 to base station 105-*a*. Base station 105-*a* may receive the combination index value 220, and may similarly use generated or stored scalable tables to identify the indicated beams. Similar to UE 115-*a*, base station 105-*a* may select a subset of tables and entries based on the configuration of $N_1$, $N_2$, L, or some other parameters. Base station 105-*a* may start with the greatest beam index of the beam indices and the last selected table of the set of tables. Working in a descending order, base station 105-*a* may determine beam indices based on the tables and the combination index value 220. For example, base station 105-*a* may determine a first beam index by searching the last table for a greatest value of the active entries that is less than or equal to the combination index value 220. Base station 105-*a* may set the first beam index to the beam index corresponding to the identified greatest value less than or equal to the combination index value 220, and may update the combination index value 220 by subtracting the identified greatest value from it. Base station 105-*a* may then use this updated combination index value and the second-to-last table to determine a second beam index using the same process. Base station 105-*a* may continue this iterative process until it has determined each beam index indicated by the combination index value 220. Base station 105-*a* may use these beam indices—or sets of sub-beam indices corresponding to these beam indices—to select beams for MIMO transmission with UE 115-*a*. The selected beams may improve channel reliability, as the beams were originally selected by UE 115-*a* based on the reference signals 215, the configured antenna ports, the determined channel quality, or some combination thereof.

In one embodiment, UE 115-*a*, base station 105-*a*, or both may use formulas rather than scalable tables. In this embodiment, rather than looking up values corresponding to each beam index in scalable tables in memory, a device may perform calculations based on a set of equations to determine the values for the beam indices. These values may be equivalent to the values stored in tables in memory in other embodiments. For example, to determine the value corresponding to a first beam index (i.e., beam index m=0) of an ordered set of beam indices, the device may use the equation:

$$g_0(i_0) = i_0 \quad (2)$$

For subsequent beam indexes m=1, 2, . . . , L−1, the device may use the equation:

$$g_m(i_m) = \Sigma_{n_m=m-1}^{i_m-1} \Sigma_{n_{m-1}=m-2}^{n_m-1} \cdots \Sigma_{n_2=1}^{n_3-1} \Sigma_{n_1=0}^{n_2-1} n_1 \quad (3)$$

In this way, equation 3 may map from an $(m+1)^{th}$ beam index to an additional value, where this value is a function of $i_m$ and m. In one case, if L=4, the device may determine the combination index value 220 by summing the values corresponding to each of the four beam indexes. For example:

$$v = \Sigma_{m=0}^{3} g_m(i_m) = i_0 + \Sigma_{n_1=0}^{i_1-1} n_1 + \Sigma_{n_2=1}^{i_2-1} \Sigma_{n_1+0}^{n_2-1} n_1 + \Sigma_{n_3=2}^{i_3-1} \Sigma_{n_2=1}^{n_3-1} \Sigma_{n_1=0}^{n_2-1} n_1 \quad (4)$$

In this way, equation 4 may show an example of mapping from the total set of beam indices to the combination index value, where the combination index value is a function of multiple $i_m$ and m values for a number of beams L. Accordingly, UE 115-*a*, base station 105-*a*, or both may use either scalable tables or equivalent equations to efficiently determine a combination index value 220 based on beam indices or determine the beam indices based on the combination index value 220. It is to be understood that the above equations are presented as examples, and other equations may be implemented to determine the combination index values. Similar to above, these equations may determine the combination index based on the selected beam indices (e.g., using nested summations or other relevant operations).

Figure 3:
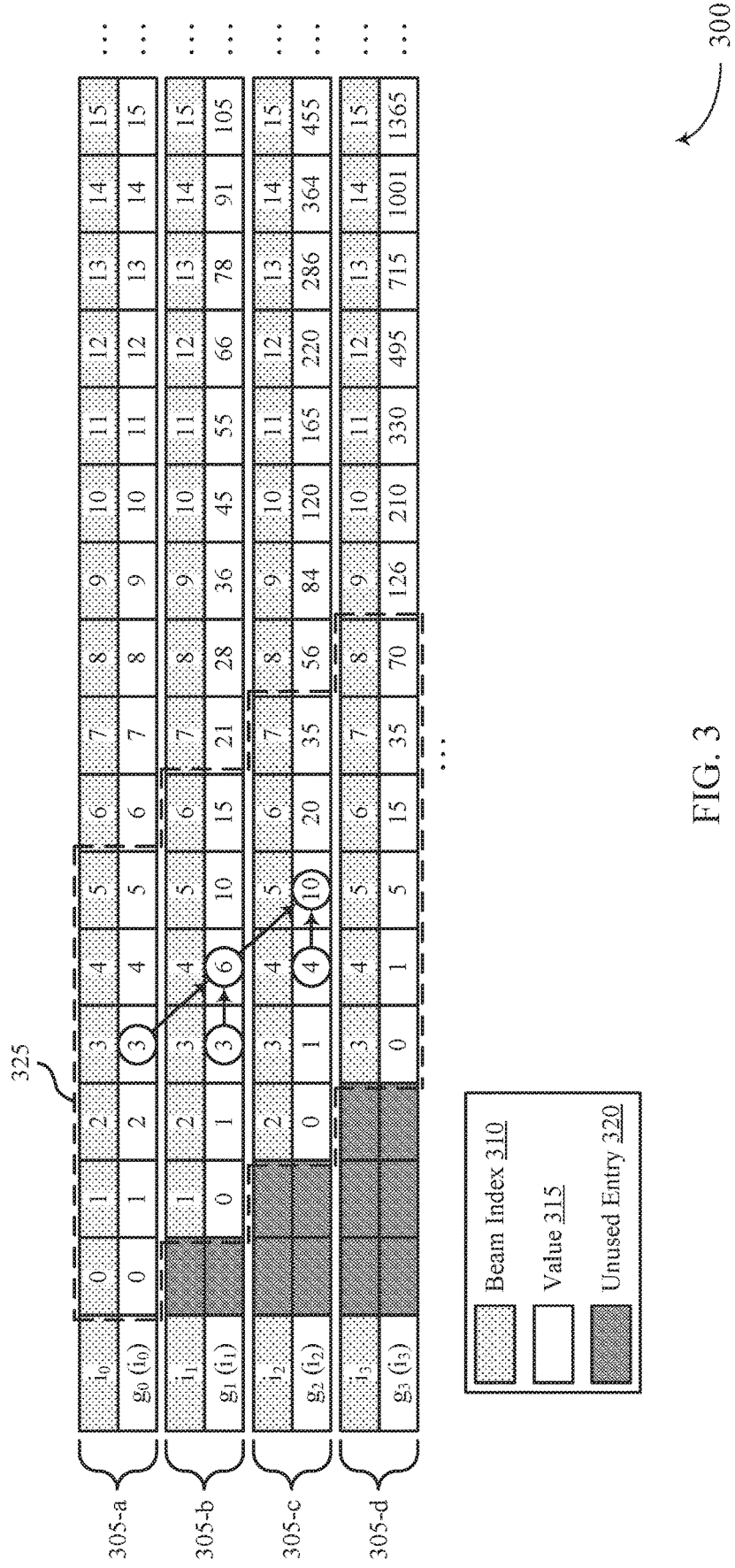
FIG. 3 illustrates an example of a set of scalable tables that supports a scalable process for indicating beam selection in accordance with aspects of the present disclosure.

FIG. 3 illustrates a set of scalable tables 300 that supports a scalable process for indicating beam selection in accordance with various aspects of the present disclosure. The set of scalable tables 300 may be scalable with $N_1$, $N_2$, L, or a combination of these parameters. For example, the set of scalable tables 300 may include $L_{max}$ tables 305, which may correspond to a maximal possible number of selected beams L configured by the wireless network. Each table m may correspond to an $(m+1)^{th}$ smallest beam index $i_m$ of a set of beam indices. The set of scalable tables 300 may map from a set of selected beams—and corresponding set of beam indices—to a unique combination index value. In some cases, a UE 115, as described with reference to FIGS. 1 and 2, may store the set of scalable tables 300 in memory to determine a combination index value based on selected beams. A base station 105, as described with reference to FIGS. 1 and 2, may store the set of scalable tables 300 in memory to determine a set of selected beams based on a received combination index value.

Tables 305 may be generated based on an iterative process. For example, in first table 305-*a*, the value 315 of each entry may be equal to the value of the beam index 310. That is:

$$g_0(i_0) = i_0 \quad (2)$$

For each table 305 following first table 305-*a*, a first value 315 (e.g., for table m>0, the value 315 corresponding to bit index m) of each subsequent table 305 may be equal to 0. Subsequent values 315 may be based on the table 305 and a previous table 305 (e.g., the immediately previous table 305). For example, the subsequent values 315 for second table 305-*b* may be based on values 315 in second table 305-*b* and values 315 in the previous table, first table 305-*a*. The value 315 corresponding to each beam index 310 may be based on the value 315 of the immediately preceding beam index 310, as well as the value 315 of the immediately preceding beam index 310 for the immediately preceding table 305. As illustrated in FIG. 3, the value 315 of a beam index of 4 in table 305-*b* may be the sum of the value 315 of the beam index of 3 for table 305-*b* and the value 315 of the beam index of 3 for table 305-*a*. That is, for table m>0, for each entry n>m:

$$n = g_m(i_m) = g_{m-1}(i_m-1) + g_m(i_m-1) \quad (5)$$

Each table 305 may include a number of entries n equal to a maximum number of orthogonal 2D-DFT beams, which may be based on the size of the dimensions. For example, for a maximum first dimension size $N_{1,max}$ and a maximum second dimension size $N_{2,max}$, each table 305 may include $N_{1,max} \times N_{2,max}$ entries. While illustrated as separate tables, it should be understood that the set of scalable tables 300 may be stored in memory or implemented using any number of techniques. For example, as each table includes a single row of values 315 corresponding to beam indices 310, the set of scalable tables 300 may be stored or implemented as a single table, where the values 315 for each table 305 may correspond to a row or a column of the combined table.

A wireless device, such as a UE 115, may utilize the set of scalable tables 300 to calculate a unique combination index value. That is, each different set of beam indices 310 may correspond to a different combination index value. The UE 115 may determine a configured value for $N_1$, $N_2$, and L, and may select a subset of tables and entries 325 from the set of scalable tables 300. For example, as illustrated, the wireless device may be configured for L=4, $N_1$=3, and $N_2$=3. In such an example, the device may select the subset of tables and entries 325. For this subset, the device may select the first L tables 305 of the set of scalable tables 300. Additionally, UE 115-a may select a dedicated portion of each table 305 to utilize based on the configuration. For example, for table m, where 0≤m≤L−1, the entries n=m, m+1, ..., $N_1N_2$−(L−m) may be active for a given configuration. In the example described above, the subset of tables and entries 325 may include entries 0 through 5 for table 305-a, but may include entries 3 through 8 for table 305-d. As such, each table m may begin with entry m, and may therefore include unused entries 320 for any entries prior to entry m. In some cases, these unused entries 320 may be set to a null value or a 0.

When a UE 115 selects beams for transmission, the UE 115 may utilize the subset of tables and entries 325 to determine a combination index value corresponding to the selected beams. UE 115 may first determine a corresponding beam index 310 for each of the selected beams. For example, for the configuration described above (i.e., L=4, $N_1$=3, and $N_2$=3), the UE 115 may select four beams, each beam corresponding to beam indices 310 ranging from 0 to 8. In a specific case, the UE 115 may select beams corresponding to beam indices 1, 3, 5, and 8. Based on the configuration, the UE 115 may select the subset of tables and entries 325 for determining the combination index value. The UE 115 may first determine a value 315 from the last table 305 for the largest beam index 310. For example, for beam index 8, the UE 115 may select the corresponding value 70 from table 305-d. The UE 115 may then determine a value 315 for the next-to-last table 305 for the next largest beam index 310 (e.g., a value of 10 corresponding to beam index 5 in table 305-c). The UE 115 may continue this process until it has determined a value 315 corresponding to each selected beam index 310 (e.g., values 3 and 1 corresponding to beam indices 3 and 1 in tables 305-b and 305-a, respectively). The UE 115 may then calculate the combination index value based on the determined values 315. For example, the UE 115 may sum the determined values 315 (e.g., 70, 10, 3, and 1) to calculate the combination index value (e.g., 84). The set of scalable tables 300 may support a 1-to-1 mapping of selected beam indices to combination index values. That is, for the given configuration, only beam indices 1, 3, 5, and 8 may map to a combination index value of 84.

The UE 115 may transmit the combination index value to a base station 105 to indicate the selected beams. The base station 105 may receive the combination index value, and may use the set of scalable tables 300 to determine the indicated beams. The base station 105 may select the subset of tables and entries 325 based on the configuration. The base station 105 may then determine a beam index 310 corresponding to the largest value 315 from the last table 305 that is less than or equal to the combination index. For example, for the combination index value of 84, the base station 105 may determine the value of 70 in table 305-d is the largest value 315 less than or equal to the combination index value. Accordingly, the base station 105 may select the associated beam index 8. The base station 105 may update the combination index value based on the selected beam index. For example, the base station 105 may subtract the corresponding value 70 from the combination index value 84 to obtain an updated combination index value of 14. The base station 105 may continue to iteratively determine the remaining beam indices 310 based on updating the combination index value. For example, the base station 105 may determine that the value of 10 is the greatest value 315 of next-to-last table 305-c that is less than or equal to the updated combination index value of 14, and may select the corresponding beam index of 5 and further update the combination index value (e.g., subtracting the value of 10 to obtain an updated combination index value of 4). Likewise, the base station 105 may determine the other two beam indices of 3 and 1 using the iterative process. Therefore, the base station 105 may determine the beam indices—and corresponding selected beams—based on the combination index value and using the set of scalable tables 300.

Figure 4:
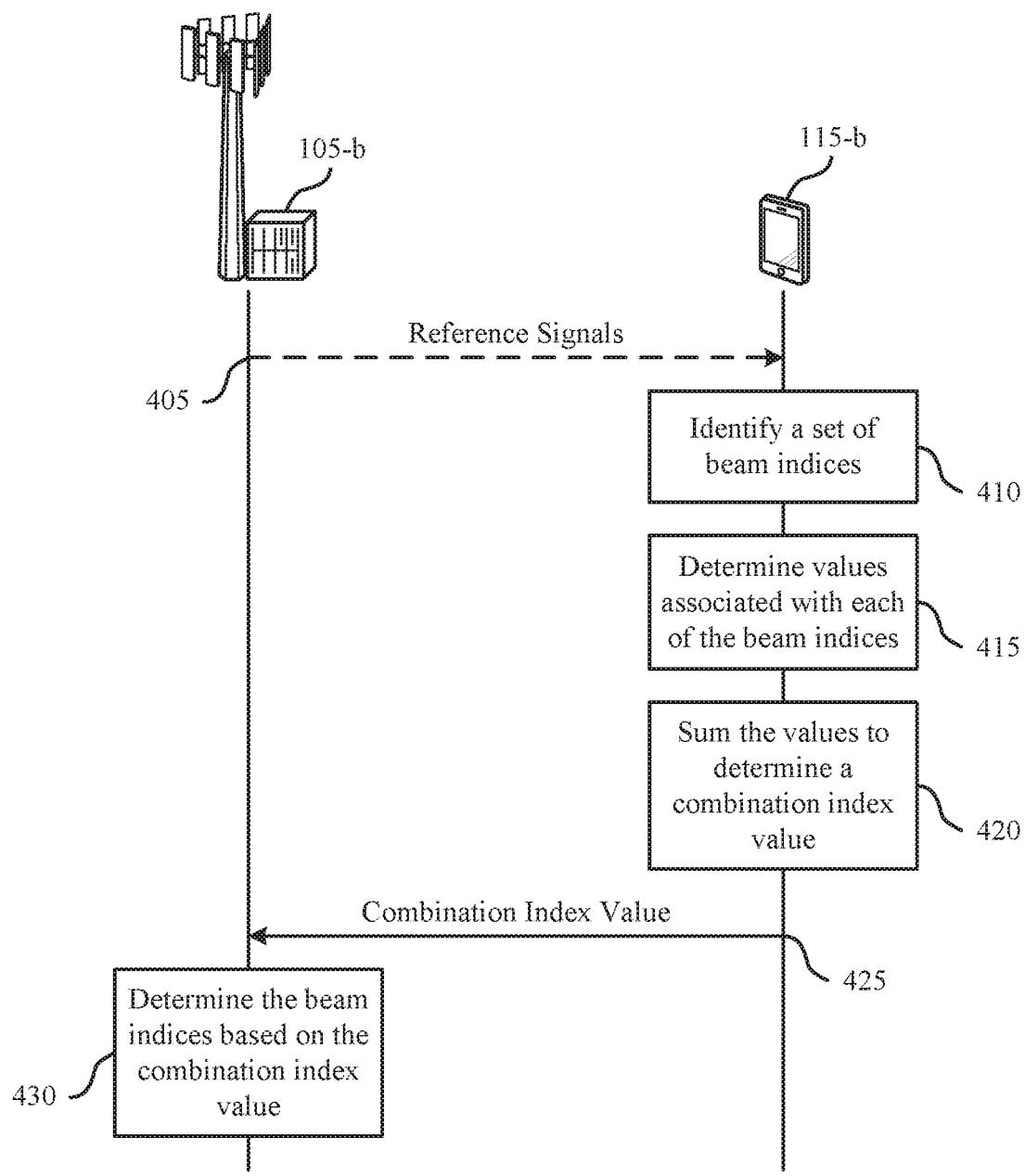
FIG. 4 illustrates an example of a process flow that supports a scalable process for indicating beam selection in accordance with aspects of the present disclosure.

FIG. 4 illustrates a process flow 400 that supports a scalable process for indicating beam selection in accordance with various aspects of the present disclosure. The process flow 400 may include base station 105-b and UE 115-b, which may be examples of the devices described with reference to FIGS. 1 and 2. Base station 105-b may transmit reference signals to UE 115-b using one or more antenna ports, and UE 115-b may select beams based on the reference signals (e.g., based on the corresponding antenna ports). UE 115-b may then indicate the selected beams to base station 105-b using a scalable set of tables.

At 405, base station 105-b may transmit a set of reference signals associated with one or more antenna ports to UE 115-b. The set of reference signals may be transmitted in either beam-formed or non-beam-formed transmissions.

At 410, UE 115-b may identify a set of beam indices. In some cases, these beam indices may be based on the reference signals (e.g., based on the associated one or more antenna ports). For example, UE 115-b may select one or more beams from a codebook based on the set of reference signals. The set of beam indices may include a number of beam indices equal to the number of selected beams. In some cases, to identify a beam index of the set of beam indices, UE 115-b may identify a first sub-beam index corresponding to a first dimension and a second sub-beam index corresponding to a second dimension, and may calculate the beam index based on the first and second sub-beam indices. For example, UE 115-b may multiply the first sub-beam index by the size of the second dimension, and may add the second sub-beam index in order to calculate the beam index. The beam indices may be ordered in ascending order.

At 415, UE 115-b may determine values associated with the beam indices of the set of beam indices. UE 115-b may determine a first value associated with a first beam index of the set of beam indices. For example, the first value may be equal to the first beam index. Additionally, UE 115-b may determine additional values associated with additional beam indices of the set of beam indices based on one or more tables. For example, to determine an additional value, UE 115-b may utilize a preceding table and a current table of the one or more tables. UE 115-b may identify a first input value associated with the preceding beam index from the preceding table and a second input value associated with the preceding beam index from the current table, and may sum the first and second input values to determine the additional value associated with a beam index. Alternatively, UE may directly obtain the additional values as the values associated with the additional beam index from the current table.

At 420, UE 115-b may sum the first value with the additional values in order to calculate a combination index value. At 425, UE 115-b may transmit the combination index value to base station 105-b.

At 430, base station 105-b may determine the beam indices indicated by the combination index value. For example, base station 105-b may determine a greatest beam index for a first beam of a selected set of beams based on a current table and the received combination index value. Base station 105-b may additionally determine an additional beam index for each additional beam of the selected set of beams based on a current table and an updated combination index value. For each of the beams, base station 105-b may identify a greatest value in the current table that is less than or equal to the current (e.g., received or updated) combination index value, and may set the beam index to the beam index value corresponding to the identified greatest value. Base station 105-b may then update the combination index value by subtracting the identified greatest value from the combination index value. In this way, base station 105-b may determine the beam index for each beam of the selected set of beams.

Figure 5:
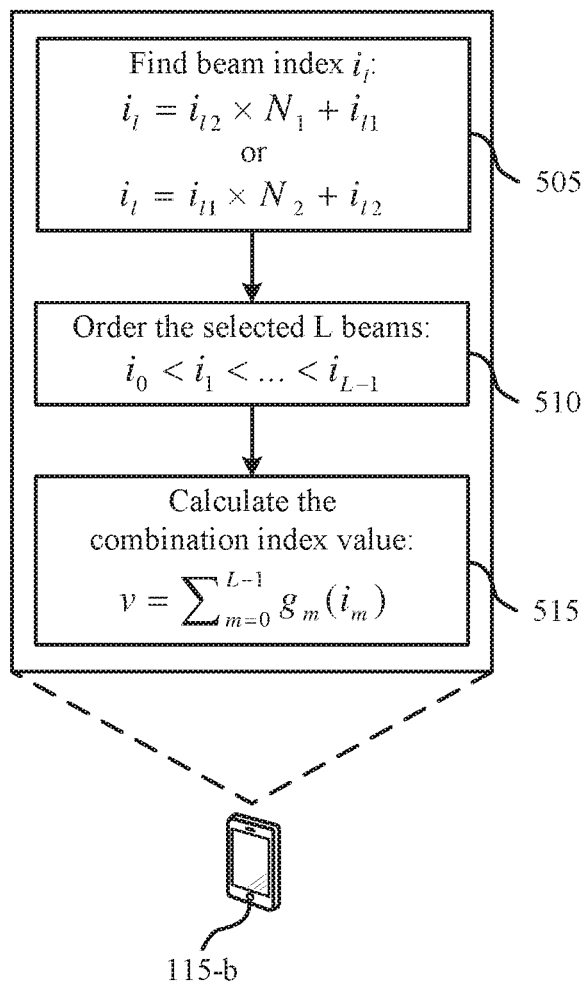
FIG. 5 illustrates an example of a user equipment (UE) process that supports a scalable process for indicating beam selection in accordance with aspects of the present disclosure.

FIG. 5 illustrates a UE process 500 that supports a scalable process for indicating beam selection in accordance with various aspects of the present disclosure. The UE process 500 may be performed by UE 115-b, which may be the same UE 115-b discussed in FIG. 4, or any UE 115 discussed in FIGS. 1 and 2. In some cases, UE 115-b may perform the UE process 500 using a set of scalable tables stored in memory (e.g., as a single table or multiple tables), as described above with reference to FIG. 3. In other cases, UE 115-b may use a set of equations to perform the UE process 500, wherein the set of equations or the set of scalable tables may lead to the same results.

At 505, UE 115-b may perform a first process to determine a beam index for each selected beam. For example, UE 115-b may select a set of beams based on received reference signals, channel estimations, or both. Each selected beam may correspond to a sub-beam index in each dimension. That is, for 2D-DFT beams, each beam may be defined by a first sub-beam index $i_{l1}$ in a first dimension $N_1$ and a second sub-beam index $i_{l2}$ in a second dimension $N_2$. For example, the index of the first dimension may be a value of the set $i_{l1}=0, 1, \ldots, N_1-1$, and the index of the second dimension may be a value of the set $i_{l2}=0, 1, \ldots, N_2-1$. Based on the sub-beam indices, UE 115-b may determine a beam index corresponding to the selected beam that may be used in the set of scalable tables or set of equations. UE 115-b may calculate the beam index $i_l$ based on the sub-beam indices using one of the following two equations, or some similar equation based on the sub-beam indices and/or the dimensions:

$$i_l = i_{l1} \times N_2 + i_{l2} \quad (6)$$

$$i_l = i_{l2} \times N_1 + i_{l1} \quad (7)$$

At 510, UE 115-b may order the selected beam indices in ascending order. That is, for the beam indices corresponding to the L selected beams, UE 115-b may order the beam indices $i_l$ such that $i_0 < i_1 < \ldots < i_{L-1}$.

At 515, UE 115-b may calculate a combination index value corresponding to the beam indices. The combination index value may be based on a set of values, where each value of the set corresponds to a beam index of the ordered set of beam indices. The value for a beam index m may be defined as $g_m(i_m)$. UE 115-b may determine the value corresponding to each beam index, and may sum the values to determine the combination index value v. For example:

$$v = f(i_0, i_1, \ldots, i_{L-1}) = \Sigma_{m=0}^{L-1} g_m(i_m) \quad (8)$$

That is, UE 115-b may use an equation, such as equation 8 or some similar equation, to determine the combination index value as a function of a summation based on the variables $i_m$ and m for a set of length L. In order to determine the value corresponding to each beam index, UE 115-b may utilize a set of scalable tables or an equation. If UE 115-b uses the set of tables, UE 115-b may first determine the value of the last beam index $i_{L-1}$ from the last table, table L−1. Table L−1 may include entries L, L+1, ..., $N_1N_2-1$, where one of these entries corresponds to the last beam index. UE 115-b may search table L−1 for the value $g_{L-1}(i_{L-1})$ associated with the beam index $i_{L-1}$. In addition to determining the value for beam index $i_{L-1}$, UE 115-b may similarly determine the value for beam index $i_{L-2}$ from entries L−1, L, ..., $N_1N_2-2$ of table L−2. UE 115-b may perform this process for each beam index of the set of beam indexes from $i_{L-1}$ to $i_1$. UE 115-b may additionally determine the value for beam index $i_0$ according to equation 2 (i.e., $g_0(i_0)=i_0$). UE 115-b may then calculate the combination index v according to equation 8.

Figure 6:
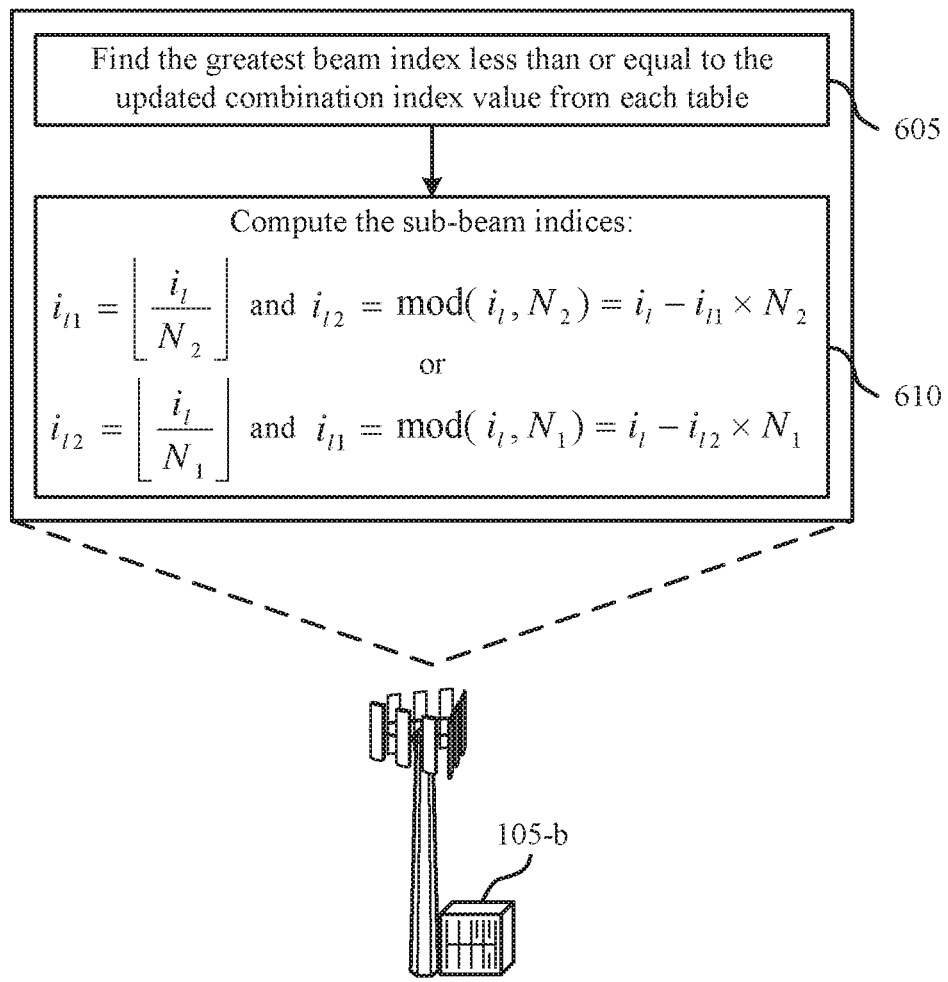
FIG. 6 illustrates an example of a base station process that supports a scalable process for indicating beam selection in accordance with aspects of the present disclosure.

FIG. 6 illustrates a base station process 600 that supports a scalable process for indicating beam selection in accordance with various aspects of the present disclosure. The base station process 600 may be performed by base station 105-b, which may be the same base station 105-b discussed in FIG. 4, or any base station 105 discussed in FIGS. 1 and 2. In some cases, base station 105-b may perform the base station process 600 using a set of scalable tables stored in memory, as described above with reference to FIG. 3. In other cases, base station 105-b may use a set of equations to perform the base station process 600, wherein the set of equations or the set of scalable tables may lead to the same results.

At 605, base station 105-b may map a received combination index value to a set of beam indices. For example, base station 105-b may receive a combination index value from a UE 115, where the combination index value indicates a set of beams selected by the UE 115 for communication with base station 105-b. Base station 105-b may determine the beam indices of the set of beam indices in descending order based on a selected set of tables and the combination index value v. For example, base station 105-b may first determine a greatest beam index of the set of beam indices using a last table of a set of selected tables.

In one aspect, base station 105-b may select the first L tables (e.g., ranging from table 0 to table L−1) of the set of scalable tables. Base station 105-b may first search table L−1 for a greatest value $g_{L-1}(i_{L-1})$ such that $g_{L-1}(i_{L-1}) \leq v$. Base station 105-b may set the greatest beam index $i_{L-1}$ equal to the beam index value corresponding to the determined greatest value $g_{L-1}(i_{L-1})$. Base station 105-b may iteratively determine the remaining beam indices in descending order. For example, to determine the second greatest beam index $i_{L-2}$, base station 105-b may search table L−2 for a greatest value $g_{L-2}(i_{L-2})$ such that $g_{L-2}(i_{L-2}) \leq v - g_{L-1}(i_{L-1})$. In such cases, the greatest value must be less than or equal to the combination index value v minus the value for the determined greatest beam index. In this way, base station 105-b may determine an $l^{th}$ greatest beam index by searching table L−l for the greatest value $g_{L-l}(i_{L-l})$ such that:

$$g_{L-l}(i_{L-l}) \leq v - \Sigma_{m=1}^{l-1} g_{L-m}(i_{L-m}) \quad (9)$$

From the above described process, base station 105-*b* may determine L beam indices indicated by the received combination index value v. This mapping from the combination index value to the set of beam indices may be an example of a 1-to-1 mapping, the determined beam indices may correspond to a set of L beams selected by a UE 115.

At 610, base station 105-*b* may compute sub-beam indices based on the determined set of beam indices. A sub-beam index may define one dimension or direction for a beam. For example, for 2D-DFT beams, each beam index $i_l$ may be deconstructed into a first sub-beam index $i_{l1}$ in a first dimension $N_1$ and a second sub-beam index $i_{l2}$ in a second dimension $N_2$. The sub-beam indices $i_{l1}$ and $i_{l2}$ may define a beam selected by the UE 115 for communication. Base station 105-*b* may calculate the sub-beam indices using one of the following two set of equations, or some similar equation:

$$i_{l1} = \left\lfloor \frac{i_l}{N_2} \right\rfloor \text{ and } i_{l2} = \mod(i_l, N_2) = i_l - i_{l1} \times N_2 \quad (10)$$

$$i_{l2} = \left\lfloor \frac{i_l}{N_1} \right\rfloor \text{ and } i_{l1} = \mod(i_l, N_1) = i_l - i_{l2} \times N_1 \quad (11)$$

Base station 105-*b* may determine the beams to communicate on with the UE 115 based on the calculated sub-beam indices.

Figure 7:
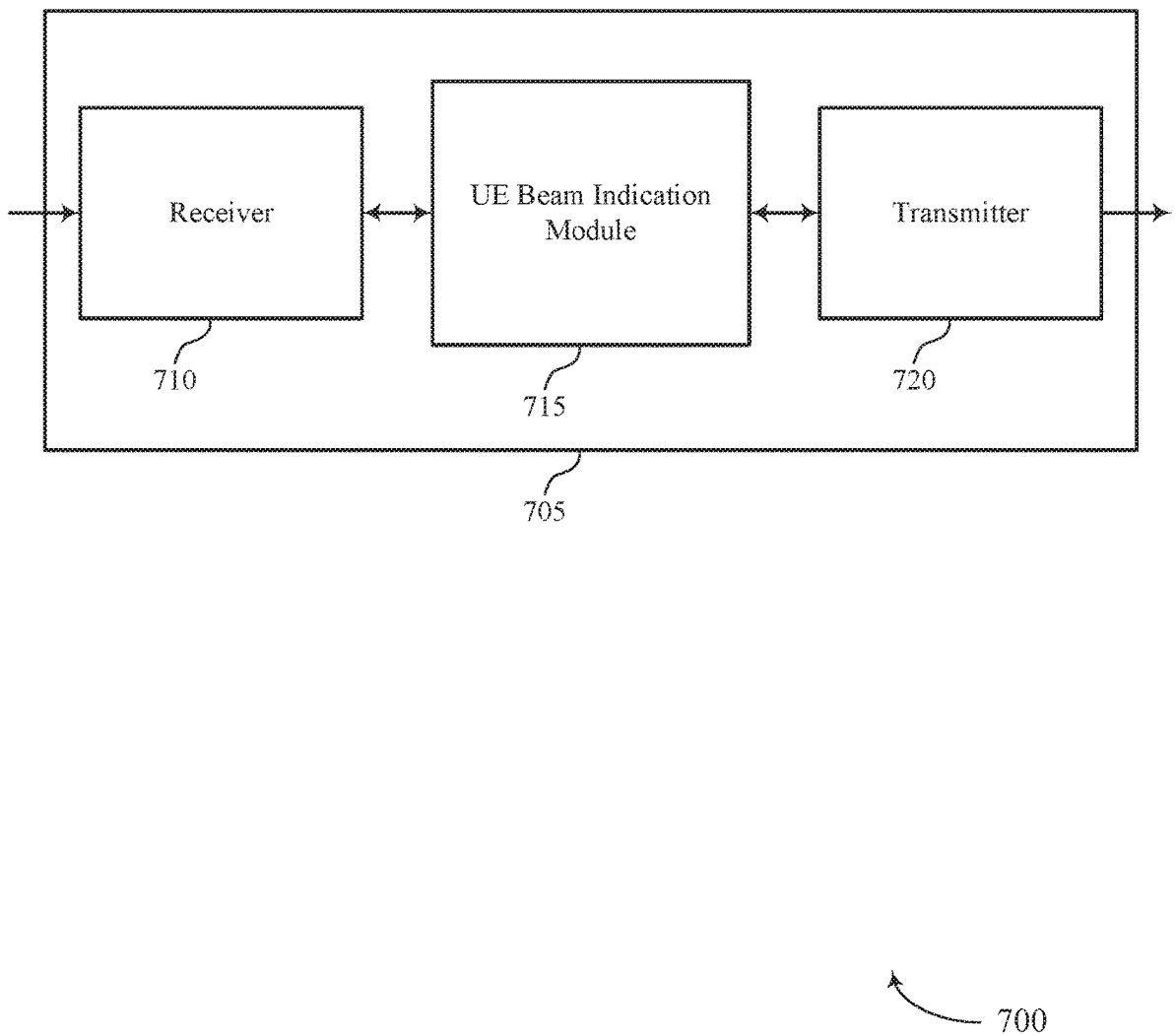
FIGS. 7 through 9 show block diagrams of a device that supports a scalable process for indicating beam selection in accordance with aspects of the present disclosure.

FIG. 7 shows a block diagram 700 of a wireless device 705 that supports a scalable process for indicating beam selection in accordance with aspects of the present disclosure. Wireless device 705 may be an example of aspects of a UE 115 as described herein. Wireless device 705 may include receiver 710, UE beam indication module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to a scalable process for indicating beam selection, etc.). Information may be passed on to other components of the device. The receiver 710 may be an example of aspects of the transceiver 1035 described with reference to FIG. 10. The receiver 710 may utilize a single antenna or a set of antennas.

UE beam indication module 715 may be an example of aspects of the UE beam indication module 1015 described with reference to FIG. 10. UE beam indication module 715 and/or at least some of its various sub-components may be implemented in hardware, software executed by a processor, firmware, or any combination thereof. If implemented in software executed by a processor, the functions of the UE beam indication module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE beam indication module 715 and/or at least some of its various sub-components may be physically located at various positions, including being distributed such that portions of functions are implemented at different physical locations by one or more physical devices. In some examples, UE beam indication module 715 and/or at least some of its various sub-components may be a separate and distinct component in accordance with various aspects of the present disclosure. In other examples, UE beam indication module 715 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

In some case, UE beam indication module 715 may receive, from a base station, a set of reference signals associated with one or more antenna ports of the base station, and may identify a set of beam indices based on the set of reference signals, the one or more antenna ports, or a combination thereof.

UE beam indication module 715 may identify a set of selected beams for reporting to a base station, determine a first value associated with a first beam index of a set of beam indices (e.g., the beam indices identified based on the reference signals or antenna ports), the first value corresponding to a first index value of a first table, where the set of beam indices includes a number of beam indices equal to a number of selected beams of the set of selected beams, determine an additional value associated with one or more additional beam indices of the set of beam indices based on one or more additional tables, sum the first value and one or more of the additional values to determine a combination index value, and transmit, to the base station, the combination index value indicating the set of selected beams.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
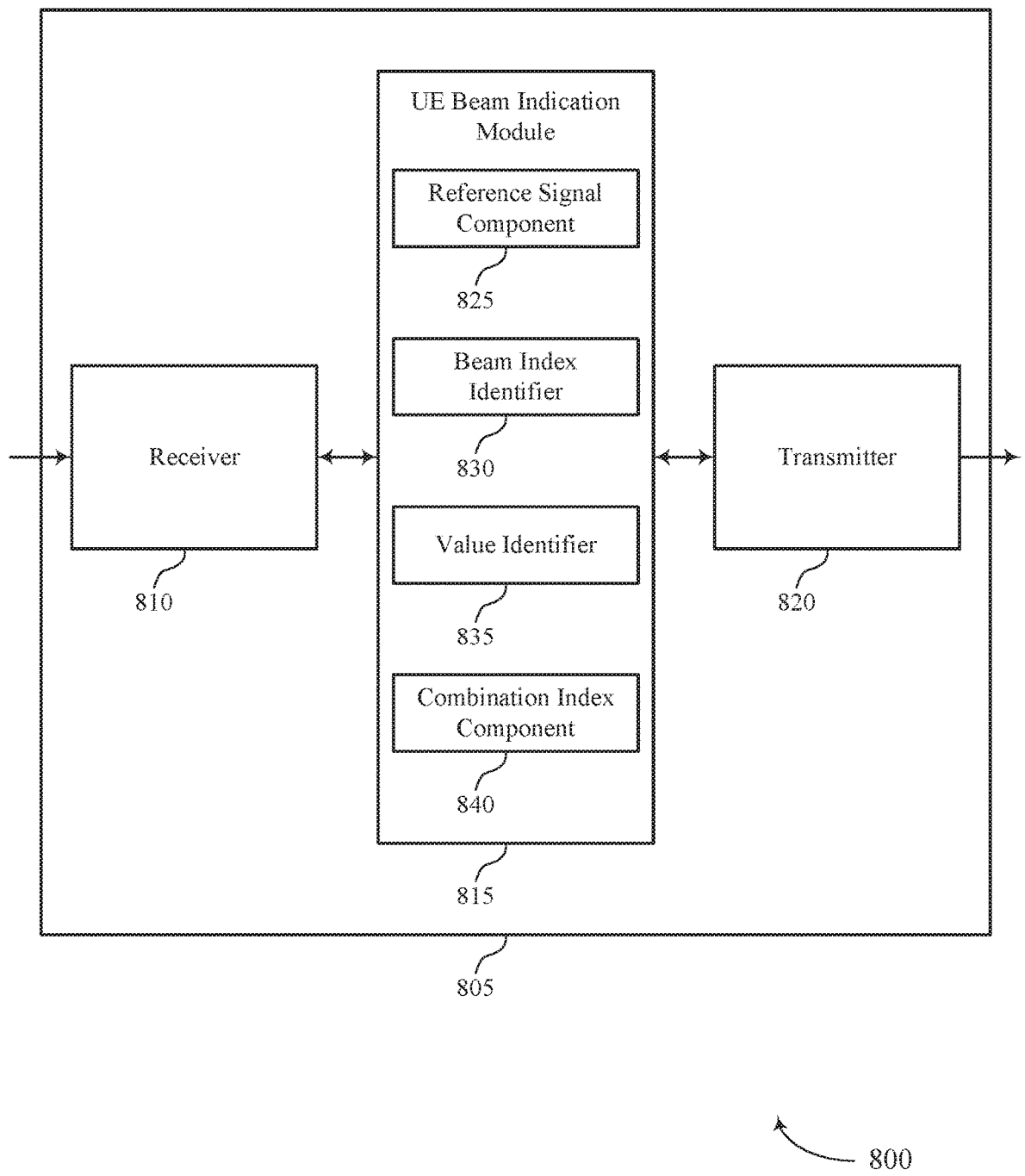

FIG. 8 shows a block diagram 800 of a wireless device 805 that supports a scalable process for indicating beam selection in accordance with aspects of the present disclosure. Wireless device 805 may be an example of aspects of a wireless device 705 or a UE 115 as described with reference to FIG. 1 through 5 or 7. Wireless device 805 may include receiver 810, UE beam indication module 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to a scalable process for indicating beam selection, etc.). Information may be passed on to other components of the device. The receiver 810 may be an example of aspects of the transceiver 1035 described with reference to FIG. 10. The receiver 810 may utilize a single antenna or a set of antennas.

UE beam indication module 815 may be an example of aspects of the UE beam indication module 715, 915, or 1015 described with reference to FIGS. 7, 9, and 10. UE beam indication module 815 may also include reference signal component 825, beam index identifier 830, value identifier 835, and combination index component 840.

Reference signal component 825 may receive, from a base station, a set of reference signals associated with one or more antenna ports of the base station. In some cases, the set of reference signals is received in beam-formed or non-beam-formed transmissions.

Beam index identifier 830 may identify a set of selected beams for reporting to a base station. In some examples, beam index identifier 830 may identify a set of beam indices based on the set of reference signals, the one or more antenna ports, or a combination thereof, where the set of beam indices includes a number of beam indices equal to a number of selected beams. In some cases, each additional beam index of the set of beam indices increases in an ascending order with respect to a previous additional beam index. In some cases, beam index identifier 830 may calculate a beam index based on a first sub-beam index and a second sub-beam index. For example, calculating the beam index further includes multiplying the first sub-beam index with a size of the second dimension to obtain an intermediate value, and adding, to the intermediate value, the second sub-beam index to obtain the beam index.

Value identifier 835 may determine a first value associated with a first beam index of a set of beam indices (e.g., where the set of beam indices includes a number of beam indices equal to a number of selected beams of the set of selected beams), the first value corresponding to a first index value of a first table, and determine an additional value associated with one or more additional beam indices of the set of beam indices based on one or more additional tables. In some cases, the first value is equal to the first beam index. In some cases, the additional value for one or more additional beam indices is based on a preceding table and a current table of the one or more additional tables.

Combination index component 840 may sum the first value and one or more of the additional values to determine a combination index value and transmit, to the base station, the combination index value indicating the set of selected beams.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
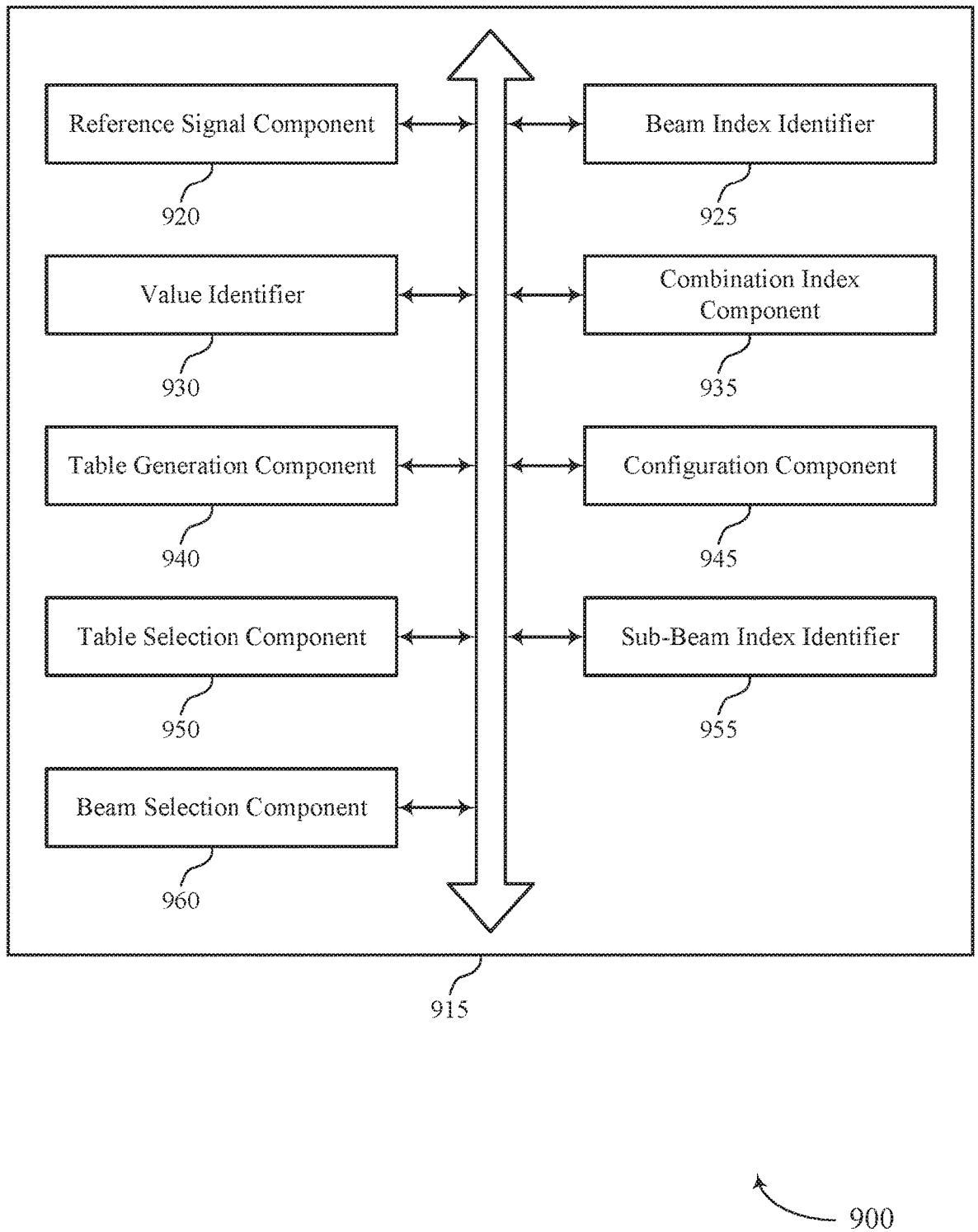

FIG. 9 shows a block diagram 900 of a UE beam indication module 915 that supports a scalable process for indicating beam selection in accordance with aspects of the present disclosure. The UE beam indication module 915 may be an example of aspects of a UE beam indication module 715, a UE beam indication module 815, or a UE beam indication module 1015 described with reference to FIGS. 7, 8, and 10. The UE beam indication module 915 may include reference signal component 920, beam index identifier 925, value identifier 930, combination index component 935, table generation component 940, table selection component 945, configuration component 950, sub-beam index identifier 955, and beam selection component 960. Each of these modules may communicate, directly or indirectly, with one another (e.g., via one or more buses).

Reference signal component 920 may receive, from a base station, a set of reference signals associated with one or more antenna ports of the base station. In some cases, the set of reference signals is received in beam-formed or non-beam-formed transmissions. In some cases, reference signal component 920 may receive a configuration of a codebook type for a codebook for reporting CSI, where identifying the set of beam indices may be based on the codebook type (e.g., and/or at least one of the set of reference signals or the one or more antenna ports). For example, the identified set of beam indices may correspond to codeword indices of the codebook if the configured codebook type is a beam selection codebook (e.g., a Type II codebook) or to antenna port indices if the configured codebook type is a port selection codebook (e.g., a Type II port selection codebook). In some examples, each codeword of a beam selection codebook may be an example of a base sequence, and the beam selection codebook may include one or more sets of orthogonal base sequences.

Beam index identifier 925 may identify a set of selected beams for reporting to a base station. In some examples, beam index identifier 925 may identify a set of beam indices based on the set of reference signals, the one or more antenna ports, or a combination thereof, where the set of beam indices includes a number of beam indices equal to a number of selected beams. In some cases, each additional beam index of the set of beam indices increases in an ascending order with respect to a previous additional beam index. In some cases, beam index identifier 925 may calculate a beam index based on a first sub-beam index and a second sub-beam index. For example, calculating the beam index may further include multiplying the first sub-beam index with a size of the second dimension to obtain an intermediate value, and adding, to the intermediate value, the second sub-beam index to obtain the beam index.

Value identifier 930 may determine a first value associated with a first beam index of a set of beam indices, the first value corresponding to a first index value of a first table, where the set of beam indices includes a number of beam indices equal to a number of selected beams of the set of selected beams. Value identifier 930 may further determine an additional value associated with one or more additional beam indices of the set of beam indices based on one or more additional tables. In some cases, the first value is equal to the first beam index. In some cases, the additional value for one or more beam indices is based on a current table of the additional tables. Value identifier 930 may identify, from the current table, an input value associated with an additional beam index of the set of beam indices, wherein the additional value is equal to the input value. In other cases, the additional value for one or more additional beam indices is based on a preceding table and a current table of the one or more additional tables.

Combination index component 935 may sum the first value and one or more of the additional values to determine a combination index value and transmit, to the base station, the combination index value indicating the set of selected beams.

Table generation component 940 may identify a preceding beam index that is one less than an additional beam index of the set of beam indices. Table generation component 940 may then identify, from the preceding table, a first input value associated with the preceding beam index and, from the current table, a second input value associated with the preceding beam index, and may sum the first input value and the second input value to obtain the additional value for the additional beam index.

Configuration component 945 may receive a configuration from the base station indicating a configured number of beams for selection, where the number of selected beams equals the configured number of beams for selection. For example, the configured number of beams for selection may be based on a configuration of a number of antenna ports. In some cases, configuration component 945 may receive a first configuration from the base station indicating the configured number of beams for selection and receive a second configuration from the base station indicating a second configured number of beams for selection that is greater than the configured number of beams for selection. Additionally or alternatively, configuration component 945 may receive a first configuration from the base station indicating a first configured number of antenna ports, configured number of beams, or combination thereof and receive a second configuration from the base station indicating a second configured number of antenna ports, configured number of beams, or combination thereof that is greater than the first configured number of beams.

Table selection component 950 may select a first set of tables including a number of tables equal to the configured number of beams for selection, where determining the first value and one or more additional values is based on the first set of tables. Table selection component 945 may additionally select a second set of tables including a second number of tables equal to the second configured number of beams for selection, where the first set of tables is a subset of the second set of tables. Similarly, table selection component 950 may select a first set of active entries for each table of the set of tables based on the first configured number of antenna ports, configured number of beams, or combination thereof, and may select a second set of active entries for each table based on the second configured number of antenna ports, configured number of beams, or combination thereof, where the first set of active entries is a subset of the second set of active entries. In some cases, determining the first value and one or more of the additional values is based on a set of tables that includes the one or more additional tables stored in a memory. A set of values stored in each of the one or more additional tables may be based on a preceding set of values stored in a preceding table of the first table or the one or more additional tables. For example, a value of the set of values may be the sum of a preceding value of the set of values and a preceding table value of the preceding set of values, where the preceding value and the preceding table value may be associated with a same beam index. In some cases, each table of the set of tables (e.g., the first table and the one or more additional tables) has a same length and a number of active entries for each table is based on a configured number of antenna ports, a configured number of beams, or a combination thereof. In some cases, a number of active entries is based on a configured number of antenna ports transmitting CSI-RS, a configured number of beams, or a combination thereof.

Sub-beam index identifier 955 may identify a beam index of the set of beam indices. For example, sub-beam index identifier 955 may identify a first sub-beam index corresponding to a first dimension and a second sub-beam index corresponding to a second dimension.

Beam selection component 960 may select the set of beam indices based on the configured number of beams for selection. In some cases, beam selection component 960 may select one or more beams from a codebook based on the set of reference signals, where identifying the set of beam indices is based on the selected one or more beams. In some cases, the codebook used for the selecting may be based on a configuration of a number of antenna ports.

Figure 10:
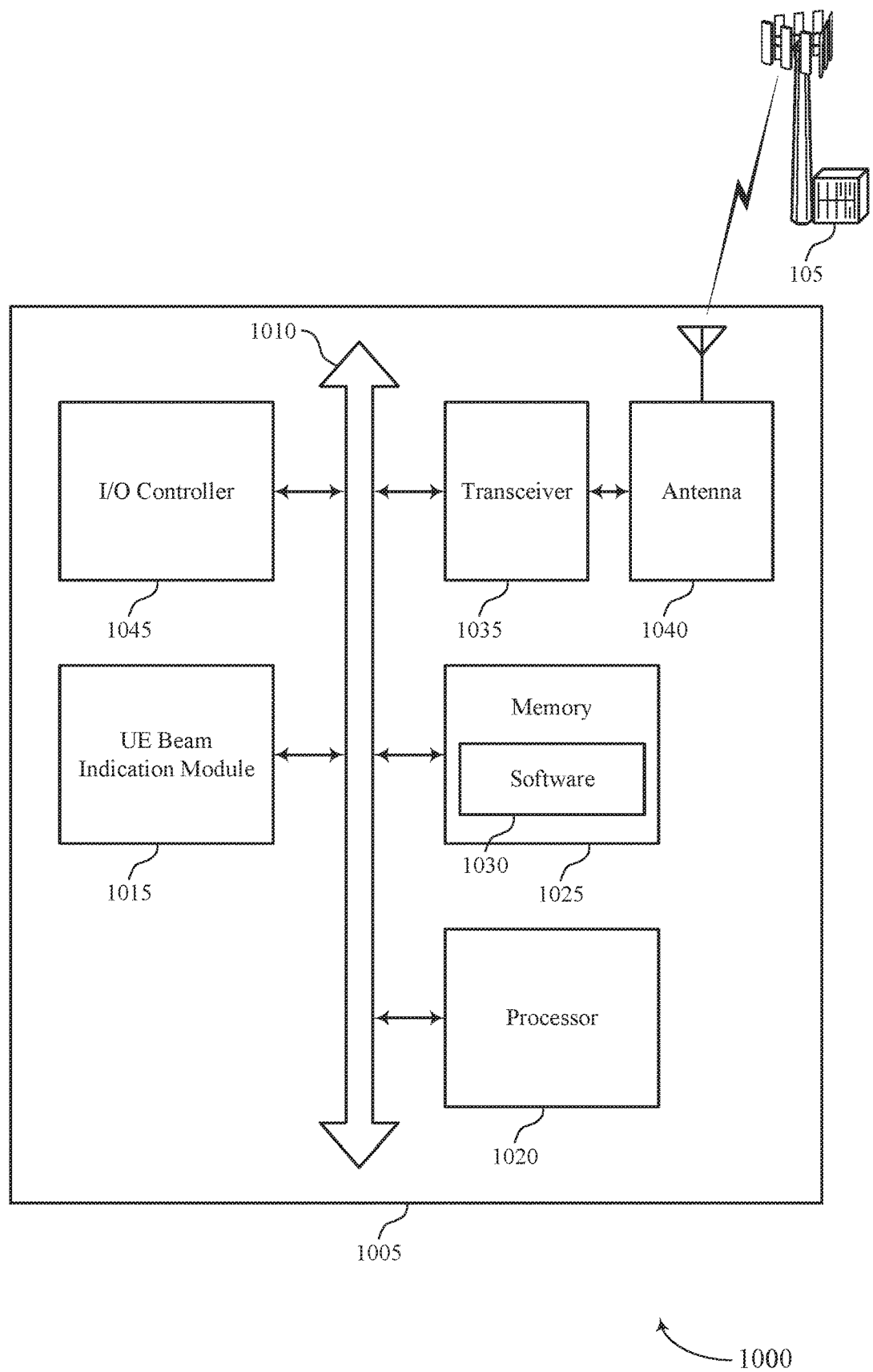
FIG. 10 illustrates a block diagram of a system including a UE that supports a scalable process for indicating beam selection in accordance with aspects of the present disclosure.

FIG. 10 shows a diagram of a system 1000 including a device 1005 that supports a scalable process for indicating beam selection in accordance with aspects of the present disclosure. Device 1005 may be an example of or include the components of wireless device 705, wireless device 805, or a UE 115 as described above, e.g., with reference to FIGS. 1 through 5, 7, and 8. Device 1005 may include components for bi-directional voice and data communications including components for transmitting and receiving communications, including UE beam indication module 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting a scalable process for indicating beam selection).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support a scalable process for indicating beam selection. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
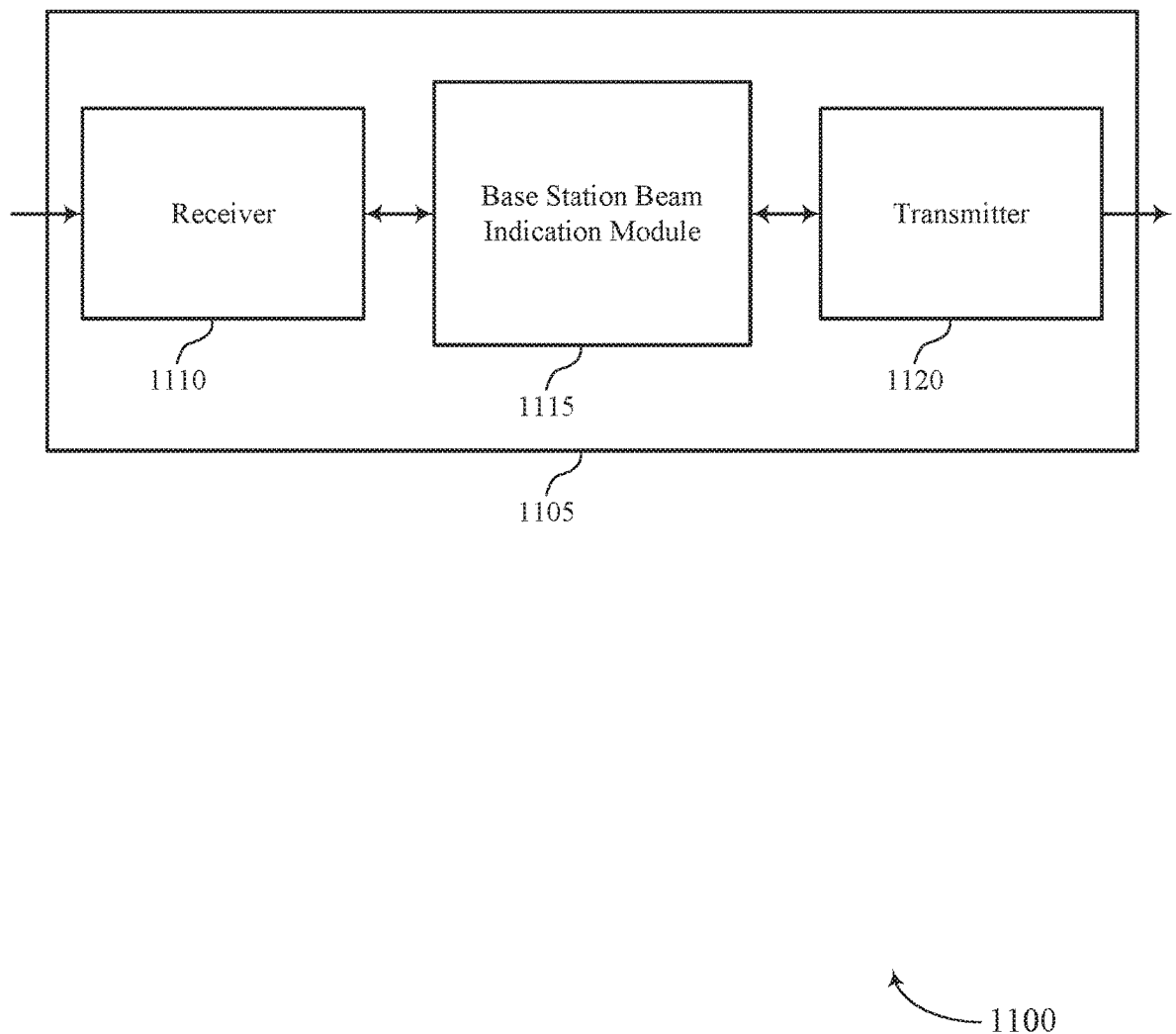
FIGS. 11 through 13 show block diagrams of a device that supports a scalable process for indicating beam selection in accordance with aspects of the present disclosure.

FIG. 11 shows a block diagram 1100 of a wireless device 1105 that supports a scalable process for indicating beam selection in accordance with aspects of the present disclosure. Wireless device 1105 may be an example of aspects of a base station 105 as described herein. Wireless device 1105 may include receiver 1110, base station beam indication module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to a scalable process for indicating beam selection, etc.). Information may be passed on to other components of the device. The receiver 1110 may be an example of aspects of the transceiver 1435 described with reference to FIG. 14. The receiver 1110 may utilize a single antenna or a set of antennas.

Base station beam indication module 1115 may be an example of aspects of the base station beam indication module 1415 described with reference to FIG. 14. Base station beam indication module 1115 and/or at least some of its various sub-components may be implemented in hardware, software executed by a processor, firmware, or any combination thereof. If implemented in software executed by a processor, the functions of the base station beam indication module 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station beam indication module 1115 and/or at least some of its various sub-components may be physically located at various positions, including being distributed such that portions of functions are implemented at different physical locations by one or more physical devices. In some examples, base station beam indication module 1115 and/or at least some of its various sub-components may be a separate and distinct component in accordance with various aspects of the present disclosure. In other examples, base station beam indication module 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station beam indication module 1115 may receive, from a UE, a combination index value indicating a set of selected beams. Base station beam indication module 1115 may further determine a greatest beam index for a first selected beam of the set of selected beams based on a current table and the combination index value, and determine an additional beam index for each additional selected beam of the set of selected beams based on one or more additional tables and an updated combination index value.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
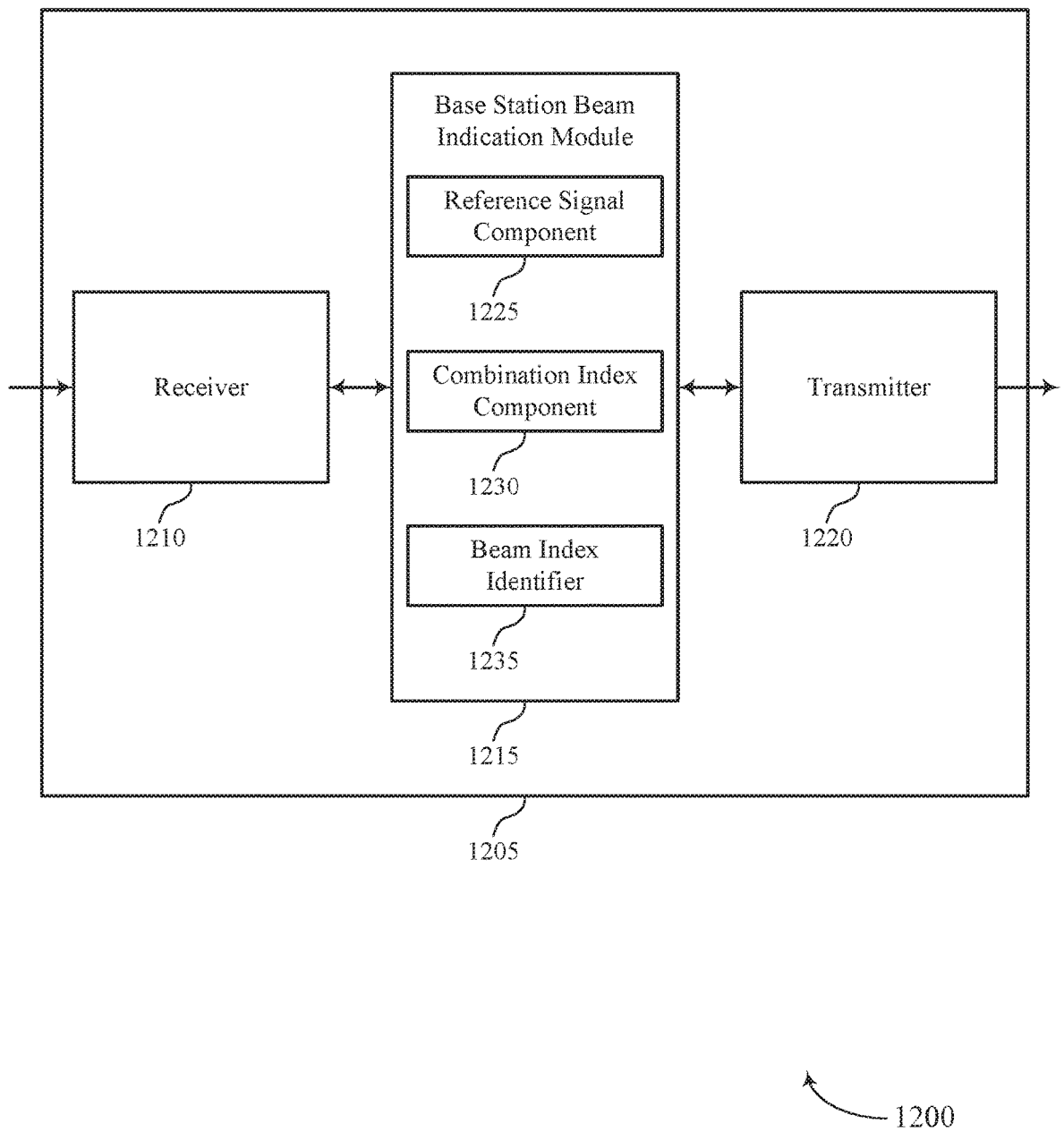

FIG. 12 shows a block diagram 1200 of a wireless device 1205 that supports a scalable process for indicating beam selection in accordance with aspects of the present disclosure. Wireless device 1205 may be an example of aspects of a wireless device 1105 or a base station 105 as described with reference to FIG. 11. Wireless device 1205 may include receiver 1210, base station beam indication module 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to a scalable process for indicating beam selection, etc.). Information may be passed on to other components of the device. The receiver 1210 may be an example of aspects of the transceiver 1435 described with reference to FIG. 14. The receiver 1210 may utilize a single antenna or a set of antennas.

Base station beam indication module 1215 may be an example of aspects of the base station beam indication module 1415 described with reference to FIG. 14. Base station beam indication module 1215 may also include reference signal component 1225, combination index component 1230, and beam index identifier 1235.

Reference signal component 1225 may transmit, to a UE, a set of reference signals associated with one or more antenna ports. In some cases, the set of reference signals are transmitted in beam-formed or non-beam-formed transmissions.

Combination index component 1230 may receive, from the UE, a combination index value indicating a set of selected beams. In some cases, combination index component 1230 may additionally receive, from the UE, a second combination index value indicating a second set of selected beams, where a number of the second set of selected beams is greater than the number of the set of selected beams.

Beam index identifier 1235 may determine a greatest beam index for a first selected beam of the set of selected beams based on a current table and the combination index value, and may determine an additional beam index for each additional selected beam of the set of selected beams based on one or more additional tables and an updated combination index value. In some cases, each additional beam index decreases in a descending order with respect to a previous additional beam index.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
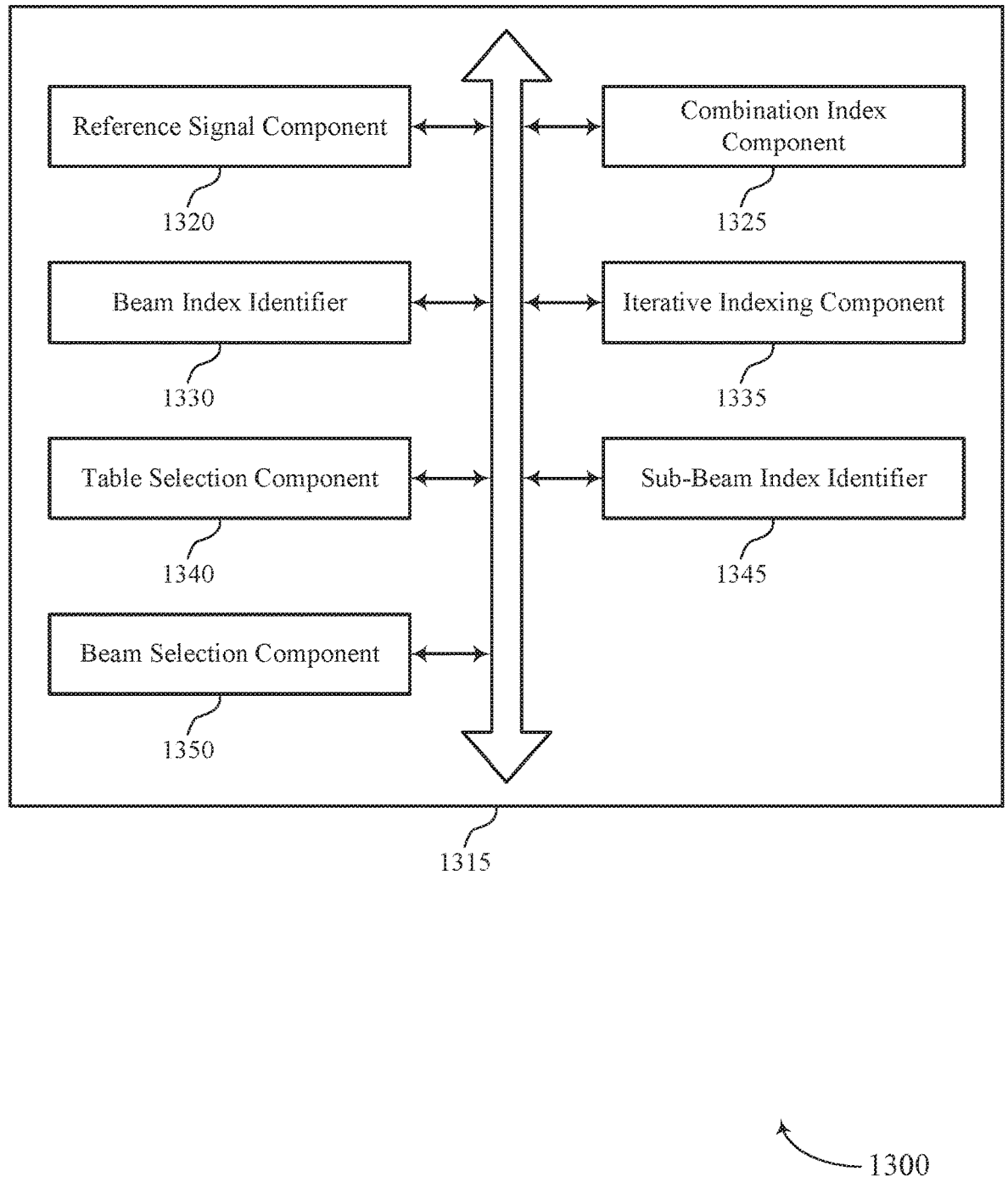

FIG. 13 shows a block diagram 1300 of a base station beam indication module 1315 that supports a scalable process for indicating beam selection in accordance with aspects of the present disclosure. The base station beam indication module 1315 may be an example of aspects of a base station beam indication module 1115, 1215, or 1415 described with reference to FIGS. 11, 12, and 14. The base station beam indication module 1315 may include reference signal component 1320, combination index component 1325, beam index identifier 1330, iterative indexing component 1335, table selection component 1340, sub-beam index identifier 1345, and beam selection component 1350. Each of these modules may communicate, directly or indirectly, with one another (e.g., via one or more buses).

Reference signal component 1320 may transmit, to a UE, a set of reference signals associated with one or more antenna ports. In some cases, the set of reference signals are transmitted in beam-formed or non-beam-formed transmissions. Reference signal component 1320 may transmit, to the UE, a configuration of a codebook type for a codebook (e.g., for CSI reporting). For example, the greatest beam index and the additional beam index for each additional selected beam of the set of selected beams may correspond to codeword indices of the codebook if the configured codebook type is a beam selection codebook (e.g., a Type II codebook) or to antenna port indices if the configured codebook type is a port selection codebook (e.g., a Type II port selection codebook). In some examples, each codeword of a beam selection codebook may be an example of a base sequence, and the beam selection codebook may include one or more sets of orthogonal base sequences.

Combination index component 1325 may receive, from the UE, a combination index value indicating a set of selected beams and, in some cases, may receive, from the UE, a second combination index value indicating a second set of selected beams, where a number of the second set of selected beams is greater than the number of the set of selected beams.

Beam index identifier 1330 may determine a greatest beam index for a first selected beam of the set of selected beams based on a current table and the combination index value, and may determine an additional beam index for each additional selected beam of the set of selected beams based on one or more additional tables and an updated combination index value. In some cases, each additional beam index decreases in a descending order with respect to a previous additional beam index. In some cases, beam index identifier 1330 may identify a first and a second configured number of antenna ports, a first and a second configured number of beams, or a combination thereof, where the second configured number of antenna ports or number of beams is greater than the first configured number of antenna ports or number of beams.

Iterative indexing component 1335 may identify a greatest value of the current table that is less than or equal to the combination index value, where the greatest beam index is set to an index corresponding to the identified greatest value, and may then update the combination index value by subtracting the identified greatest value from the combination index value. Iterative indexing component 1335 may further identify an additional greatest value of a next table of the one or more additional tables that is less than or equal to the updated combination index value, where the additional beam index is set to an additional index corresponding to the identified additional greatest value, and may accordingly update the updated combination index value by subtracting the identified additional greatest value from the updated combination index value. In some cases, a smallest beam index for a last selected beam of the set of selected beams is equal to a last updated combination index value.

In some cases, the current table and the one or more additional tables are selected from a set of tables stored in a memory by table selection component 1340. The set of tables may include a first table and one or more subsequent tables, where a set of values stored in each of the one or more subsequent tables is based at least in part on a preceding set of values stored in a preceding table of the set of tables. For example, a value of the set of values may be the sum of a preceding value of the set of values and a preceding table value of the preceding set of values, where the preceding value and the preceding table value may be associated with a same beam index. Table selection component 1340 may select a first set of tables including a number of tables equal to a number of the set of selected beams, where determining the greatest beam index and the additional beam index for each additional selected beam is based on the first set of tables, and may select a second set of tables including a second number of tables equal to the number of the second set of selected beams, where the first set of tables is a subset of the second set of tables. Similarly, table selection component 1340 may select a first set of active entries for each table of a set of tables stored in memory based on the first configured number of antenna ports, configured number of beams, or combination thereof, and may select a second set of active entries for each table of the set of tables based at least in part on the second configured number of antenna ports, configured number of beams, or combination thereof, where the first set of active entries may be a subset of the second set of active entries. In some cases, each table of a set of tables stored in memory includes a same length and a number of active entries for each table is based on a configured number of antenna ports, a configured number of beams, or a combination thereof. In some cases, each table of a set of tables stored in memory includes a number of active entries based on a configured number of antenna ports transmitting CSI-RS, a configured number of beams, or a combination thereof.

Sub-beam index identifier 1345 may calculate, for a beam index, a first sub-beam index corresponding to a first dimension and a second sub-beam index corresponding to a second dimension. In some cases, calculating the first sub-beam index includes dividing the beam index by a size of the second dimension to obtain an intermediate value, and rounding the intermediate value down to the nearest integer to obtain the first sub-beam index. In some cases, calculating the second sub-beam index includes dividing the beam index by a size of the second dimension to obtain the second sub-beam index, where the second sub-beam index is a remainder of the division.

Beam selection component 1350 may identify the set of selected beams based on a codebook and the greatest beam index and each additional beam index. In some cases, the codebook used for the identifying is based on a configuration of a number of antenna ports.

Figure 14:
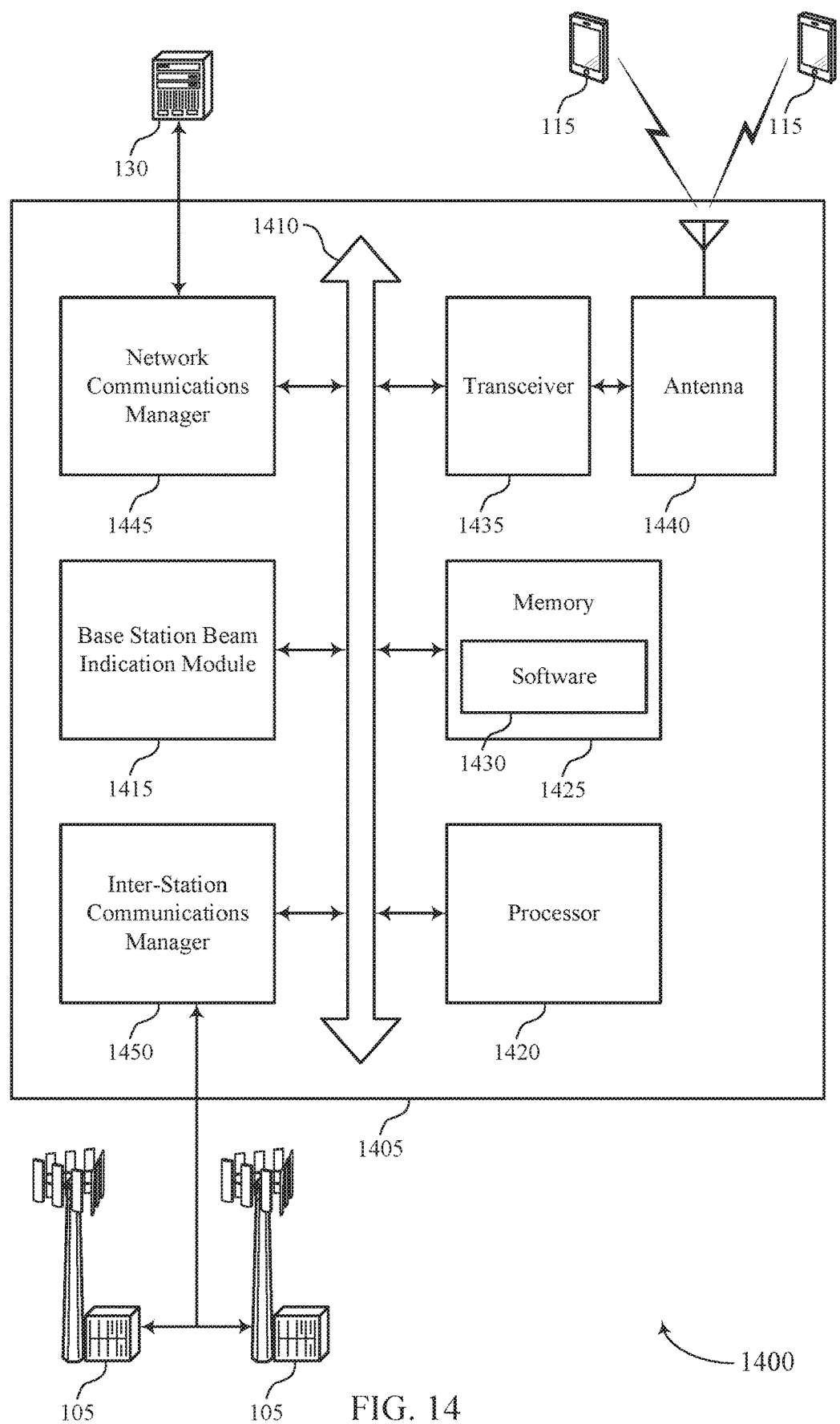
FIG. 14 illustrates a block diagram of a system including a base station that supports a scalable process for indicating beam selection in accordance with aspects of the present disclosure.

FIG. 14 shows a diagram of a system 1400 including a device 1405 that supports a scalable process for indicating beam selection in accordance with aspects of the present disclosure. Device 1405 may be an example of or include the components of a base station 105 as described above, e.g., with reference to FIGS. 1 through 4 and 6. Device 1405 may include components for bi-directional voice and data communications including components for transmitting and receiving communications, including base station beam indication module 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting a scalable process for indicating beam selection).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support a scalable process for indicating beam selection. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
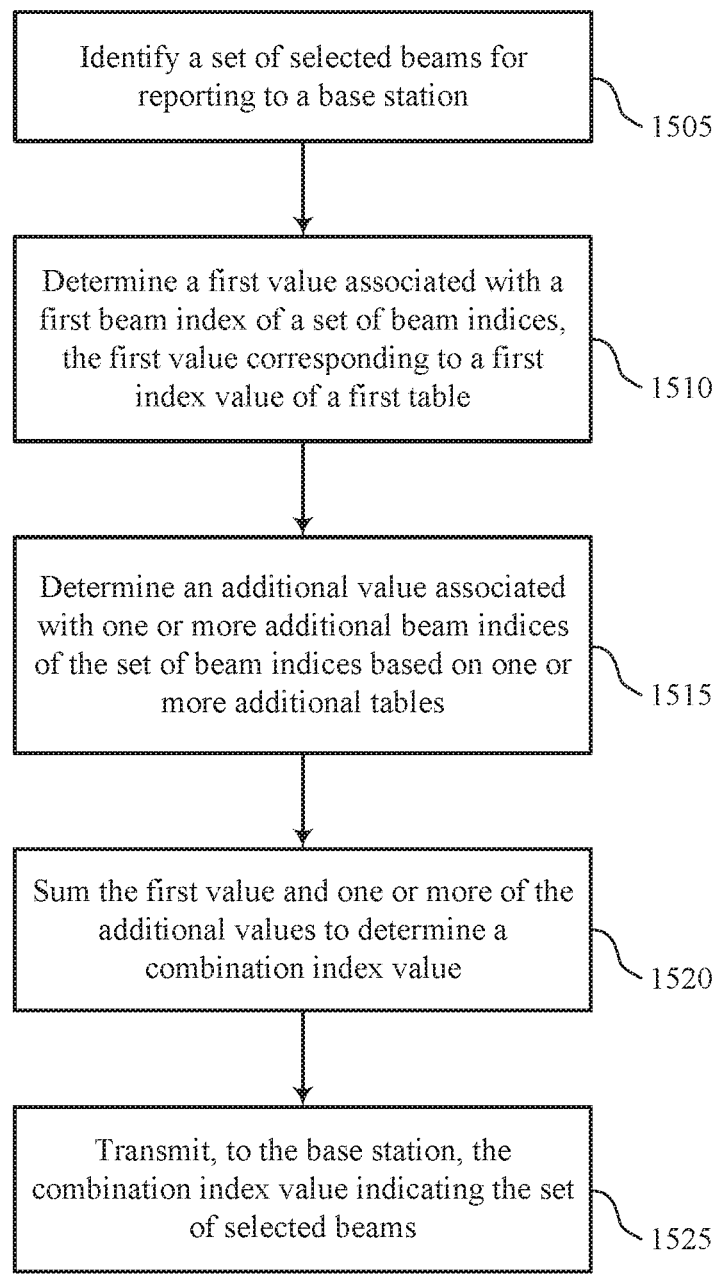
FIGS. 15 through 22 illustrate methods for a scalable process for indicating beam selection in accordance with aspects of the present disclosure.

FIG. 15 shows a flowchart illustrating a method 1500 for a scalable process for indicating beam selection in accordance with aspects of the present disclosure. The operations of method 1500 may be implemented by a UE 115 or its components as described herein. For example, the operations of method 1500 may be performed by a UE beam indication module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify a set of selected beams for reporting to a base station. The operations of block 1505 may be performed according to the methods described herein. In certain examples, aspects of the operations of block 1505 may be performed by a beam index identifier as described with reference to FIGS. 7 through 10.

At block 1510 the UE 115 may determine a first value associated with a first beam index of a set of beam indices, the first value corresponding to a first index value of a first table, wherein the set of beam indices comprises a number of beam indices equal to a number of selected beams of the set of selected beams. The operations of block 1510 may be performed according to the methods described herein. In certain examples, aspects of the operations of block 1510 may be performed by a value identifier as described with reference to FIGS. 7 through 10.

At block 1515 the UE 115 may determine an additional value associated with one or more additional beam indices of the set of beam indices based at least in part on one or more additional tables. The operations of block 1515 may be performed according to the methods described herein. In certain examples, aspects of the operations of block 1515 may be performed by a value identifier as described with reference to FIGS. 7 through 10.

At block 1520 the UE 115 may sum the first value and one or more of the additional values to determine a combination index value. The operations of block 1520 may be performed according to the methods described herein. In certain examples, aspects of the operations of block 1520 may be performed by a combination index component as described with reference to FIGS. 7 through 10.

At block 1525 the UE 115 may transmit, to the base station, the combination index value indicating the set of selected beams. The operations of block 1525 may be performed according to the methods described herein. In certain examples, aspects of the operations of block 1525 may be performed by a combination index component as described with reference to FIGS. 7 through 10.

Figure 16:
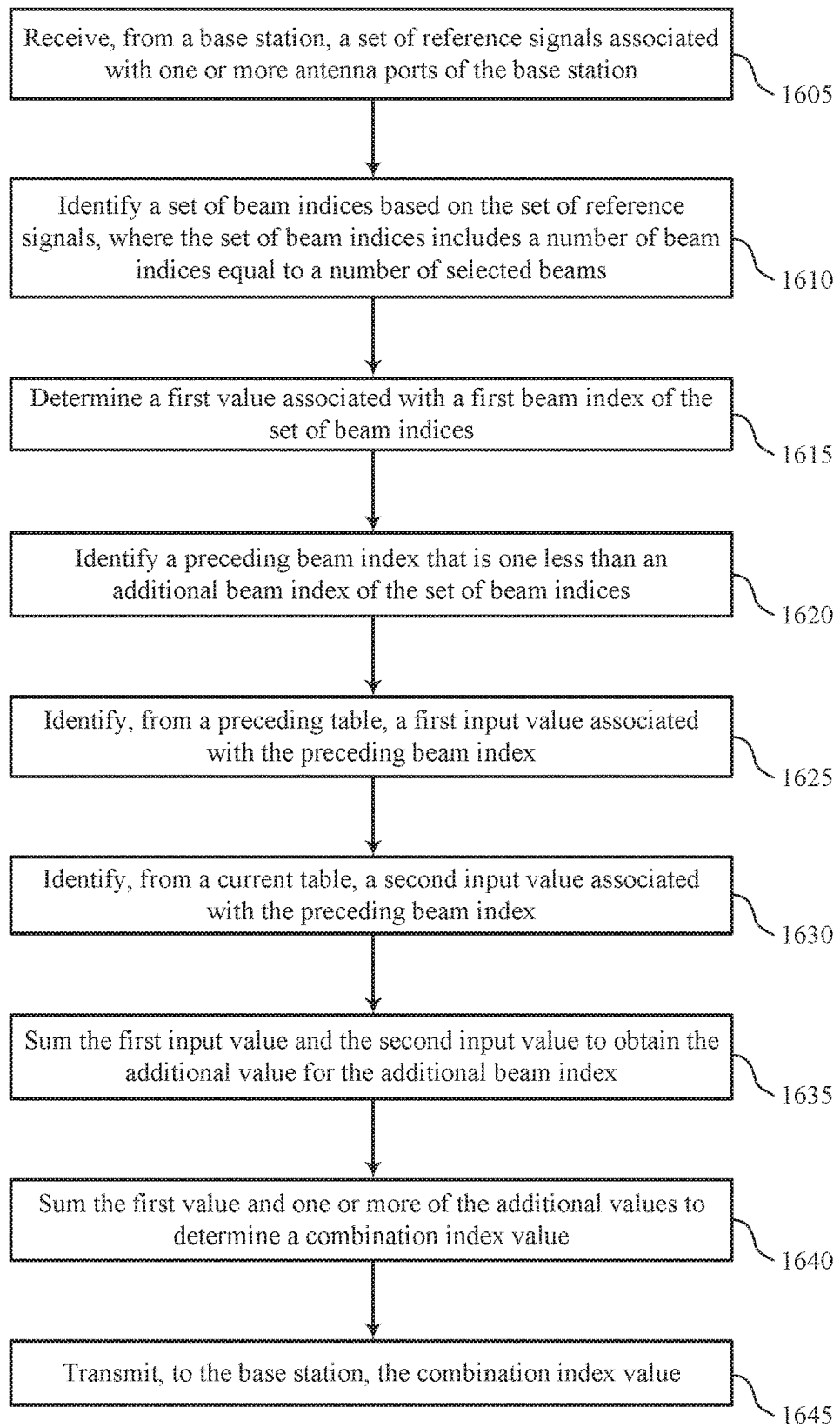

FIG. 16 shows a flowchart illustrating a method 1600 for a scalable process for indicating beam selection in accordance with aspects of the present disclosure. The operations of method 1600 may be implemented by a UE 115 or its components as described herein. For example, the operations of method 1600 may be performed by a UE beam indication module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, from a base station, a set of reference signals associated with one or more antenna ports of the base station. The operations of block 1605 may be performed according to the methods described herein. In certain examples, aspects of the operations of block 1605 may be performed by a reference signal component as described with reference to FIGS. 7 through 10.

At block 1610 the UE 115 may identify a set of beam indices based at least in part on the set of reference signals, wherein the set of beam indices comprises a number of beam indices equal to a number of selected beams. The operations of block 1610 may be performed according to the methods described herein. In certain examples, aspects of the operations of block 1610 may be performed by a beam index identifier as described with reference to FIGS. 7 through 10.

At block 1615 the UE 115 may determine a first value associated with a first beam index of the set of beam indices, the first value corresponding to a first index value of a first table. The operations of block 1615 may be performed according to the methods described herein. In certain examples, aspects of the operations of block 1615 may be performed by a value identifier as described with reference to FIGS. 7 through 10.

The UE 115 may determine an additional value associated with one or more additional beam indices of the set of beam indices based at least in part on one or more additional tables. In some cases, the additional value for one or more additional beam indices is based at least in part on a preceding table and a current table of the one or more additional tables. At block 1620 the UE 115 may identify a preceding beam index that is one less than an additional beam index of the set of beam indices. The operations of block 1620 may be performed according to the methods described herein. In certain examples, aspects of the operations of block 1620 may be performed by a table generation component as described with reference to FIGS. 7 through 10.

At block 1625 the UE 115 may identify, from the preceding table, a first input value associated with the preceding beam index. The operations of block 1625 may be performed according to the methods described herein. In certain examples, aspects of the operations of block 1625 may be performed by a table generation component as described with reference to FIGS. 7 through 10.

At block 1630 the UE 115 may identify, from the current table, a second input value associated with the preceding beam index. The operations of block 1630 may be performed according to the methods described herein. In certain examples, aspects of the operations of block 1630 may be performed by a table generation component as described with reference to FIGS. 7 through 10.

At block 1635 the UE 115 may sum the first input value and the second input value to obtain the additional value for the additional beam index. The operations of block 1635 may be performed according to the methods described herein. In certain examples, aspects of the operations of block 1635 may be performed by a table generation component as described with reference to FIGS. 7 through 10.

The UE 115 may perform the above process for each additional value associated with one or more additional beam indices of the set of beam indices. At block 1640 the UE 115 may sum the first value and one or more of the additional values to determine a combination index value. The operations of block 1640 may be performed according to the methods described herein. In certain examples, aspects of the operations of block 1640 may be performed by a combination index component as described with reference to FIGS. 7 through 10.

At block 1645 the UE 115 may transmit, to the base station, the combination index value. The operations of block 1645 may be performed according to the methods described herein. In certain examples, aspects of the operations of block 1645 may be performed by a combination index component as described with reference to FIGS. 7 through 10.

Figure 17:
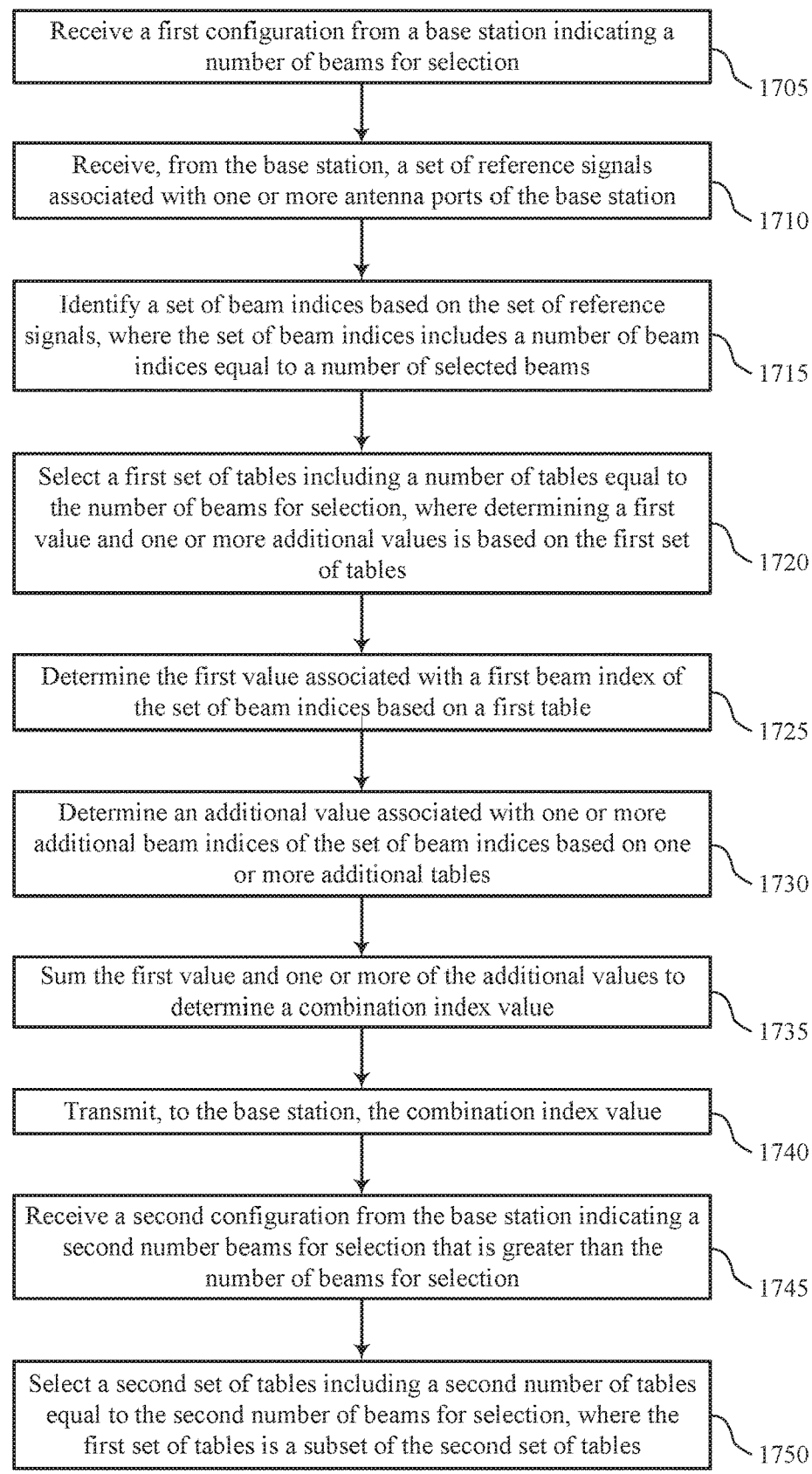

FIG. 17 shows a flowchart illustrating a method 1700 for a scalable process for indicating beam selection in accordance with aspects of the present disclosure. The operations of method 1700 may be implemented by a UE 115 or its components as described herein. For example, the operations of method 1700 may be performed by a UE beam indication module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a first configuration from a base station indicating a number of beams for selection or a configured number of antenna ports. The operations of block 1705 may be performed according to the methods described herein. In certain examples, aspects of the operations of block 1705 may be performed by a configuration component as described with reference to FIGS. 7 through 10.

At block 1710 the UE 115 may receive, from the base station, a set of reference signals associated with one or more antenna ports of the base station. The operations of block 1710 may be performed according to the methods described herein. In certain examples, aspects of the operations of block 1710 may be performed by a reference signal component as described with reference to FIGS. 7 through 10.

At block 1715 the UE 115 may identify a set of beam indices based at least in part on the set of reference signals or the one or more antenna ports, wherein the set of beam indices comprises a number of beam indices equal to a number of selected beams. The operations of block 1715 may be performed according to the methods described herein. In certain examples, aspects of the operations of block 1715 may be performed by a beam index identifier as described with reference to FIGS. 7 through 10.

At block 1720 the UE 115 may select a first set of tables comprising a number of tables equal to the number of beams for selection or the configured number of antenna ports, wherein determining a first value and one or more additional values is based at least in part on the first set of tables. The operations of block 1720 may be performed according to the methods described herein. In certain examples, aspects of the operations of block 1720 may be performed by a table selection component as described with reference to FIGS. 7 through 10.

At block 1725 the UE 115 may determine the first value associated with a first beam index of the set of beam indices (e.g., based on a first table). In some cases, determining the first value and one or more additional values is based at least in part on the set of tables that includes the one or more additional tables stored in a memory. The operations of block 1725 may be performed according to the methods described herein. In certain examples, aspects of the operations of block 1725 may be performed by a value identifier as described with reference to FIGS. 7 through 10.

At block 1730 the UE 115 may determine an additional value associated with one or more additional beam indices of the set of beam indices based at least in part on one or more additional tables. The operations of block 1730 may be performed according to the methods described herein. In certain examples, aspects of the operations of block 1730 may be performed by a value identifier as described with reference to FIGS. 7 through 10.

At block 1735 the UE 115 may sum the first value and one or more of the additional values to determine a combination index value. The operations of block 1735 may be performed according to the methods described herein. In certain examples, aspects of the operations of block 1735 may be performed by a combination index component as described with reference to FIGS. 7 through 10.

At block 1740 the UE 115 may transmit, to the base station, the combination index value. The operations of block 1740 may be performed according to the methods described herein. In certain examples, aspects of the operations of block 1740 may be performed by a combination index component as described with reference to FIGS. 7 through 10.

At block 1745 the UE 115 may receive a second configuration from the base station indicating a second number of beams for selection or configured number of antenna ports that is greater than the number of beams for selection or configured number of antenna ports. The operations of block 1745 may be performed according to the methods described herein. In certain examples, aspects of the operations of block 1745 may be performed by a configuration component as described with reference to FIGS. 7 through 10.

At block 1750 the UE 115 may select a second set of tables comprising a second number of tables equal to the second number of beams for selection or configured number of antenna ports, wherein the first set of tables is a subset of the second set of tables. The operations of block 1750 may be performed according to the methods described herein. In certain examples, aspects of the operations of block 1750 may be performed by a table selection component as described with reference to FIGS. 7 through 10.

Figure 18:
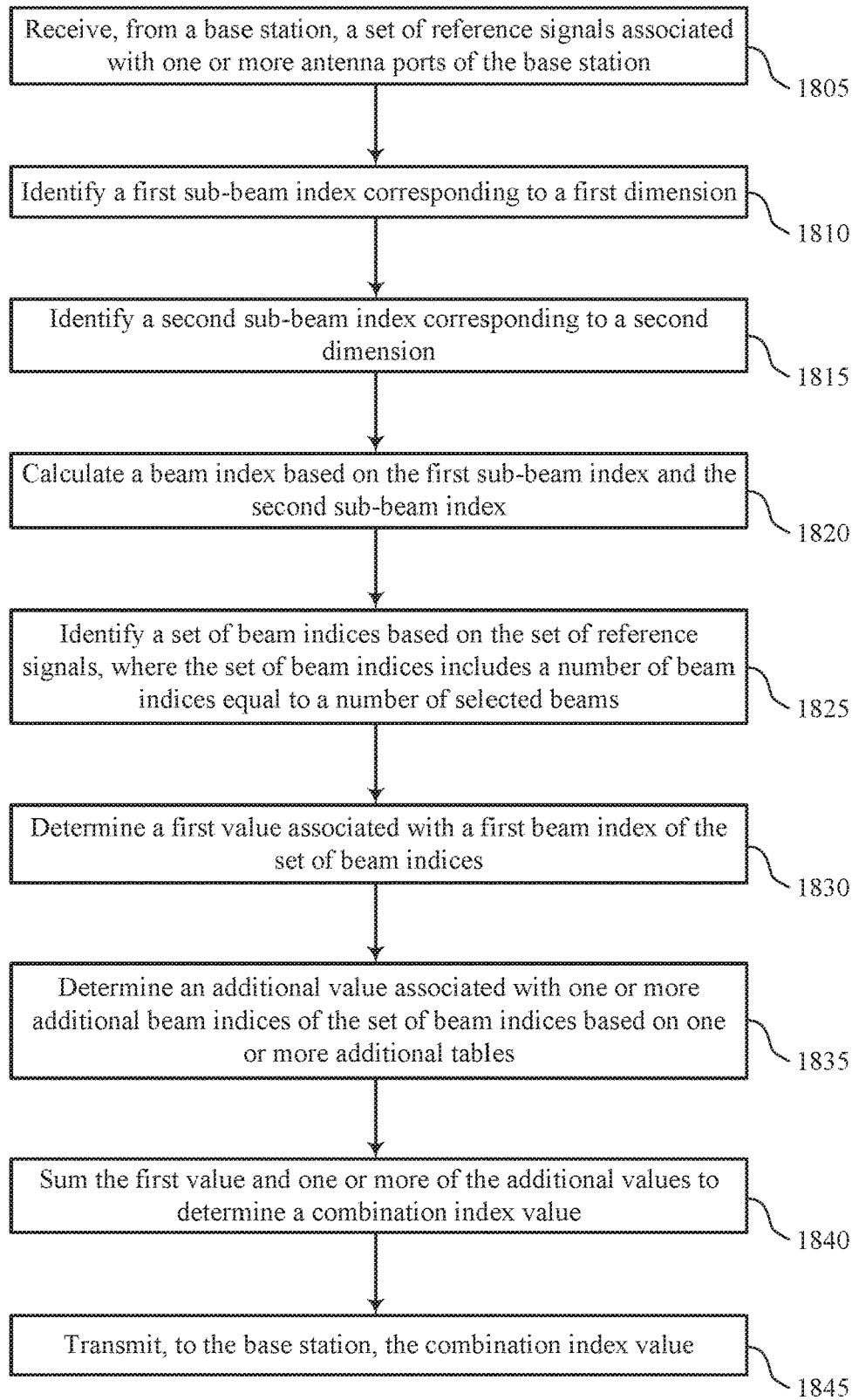

FIG. 18 shows a flowchart illustrating a method 1800 for a scalable process for indicating beam selection in accordance with aspects of the present disclosure. The operations of method 1800 may be implemented by a UE 115 or its components as described herein. For example, the operations of method 1800 may be performed by a UE beam indication module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive, from a base station, a set of reference signals associated with one or more antenna ports of the base station. The operations of block 1805 may be performed according to the methods described herein. In certain examples, aspects of the operations of block 1805 may be performed by a reference signal component as described with reference to FIGS. 7 through 10.

At block 1810 the UE 115 may identify a first sub-beam index corresponding to a first dimension. The operations of block 1810 may be performed according to the methods described herein. In certain examples, aspects of the operations of block 1810 may be performed by a sub-beam index identifier as described with reference to FIGS. 7 through 10.

At block 1815 the UE 115 may identify a second sub-beam index corresponding to a second dimension. The operations of block 1815 may be performed according to the methods described herein. In certain examples, aspects of the operations of block 1815 may be performed by a sub-beam index identifier as described with reference to FIGS. 7 through 10.

At block 1820 the UE 115 may calculate a beam index based at least in part on the first sub-beam index and the second sub-beam index. The operations of block 1820 may be performed according to the methods described herein. In certain examples, aspects of the operations of block 1820 may be performed by a beam index identifier as described with reference to FIGS. 7 through 10.

At block 1825 the UE 115 may identify a set of beam indices based at least in part on the set of reference signals or antenna ports, wherein the set of beam indices comprises a number of beam indices equal to a number of selected beams. The UE 115 may identify the set of beam indices by following the above sub-beam index calculations. The operations of block 1825 may be performed according to the methods described herein. In certain examples, aspects of the operations of block 1825 may be performed by a beam index identifier as described with reference to FIGS. 7 through 10.

At block 1830 the UE 115 may determine a first value associated with a first beam index of the set of beam indices. The operations of block 1830 may be performed according to the methods described herein. In certain examples, aspects of the operations of block 1830 may be performed by a value identifier as described with reference to FIGS. 7 through 10.

At block 1835 the UE 115 may determine an additional value associated with one or more additional beam indices of the set of beam indices based at least in part on one or more additional tables. The operations of block 1835 may be performed according to the methods described herein. In certain examples, aspects of the operations of block 1835 may be performed by a value identifier as described with reference to FIGS. 7 through 10.

At block 1840 the UE 115 may sum the first value and one or more of the additional values to determine a combination index value. The operations of block 1840 may be performed according to the methods described herein. In certain examples, aspects of the operations of block 1840 may be performed by a combination index component as described with reference to FIGS. 7 through 10.

At block 1845 the UE 115 may transmit, to the base station, the combination index value. The operations of block 1845 may be performed according to the methods described herein. In certain examples, aspects of the operations of block 1845 may be performed by a combination index component as described with reference to FIGS. 7 through 10.

Figure 19:
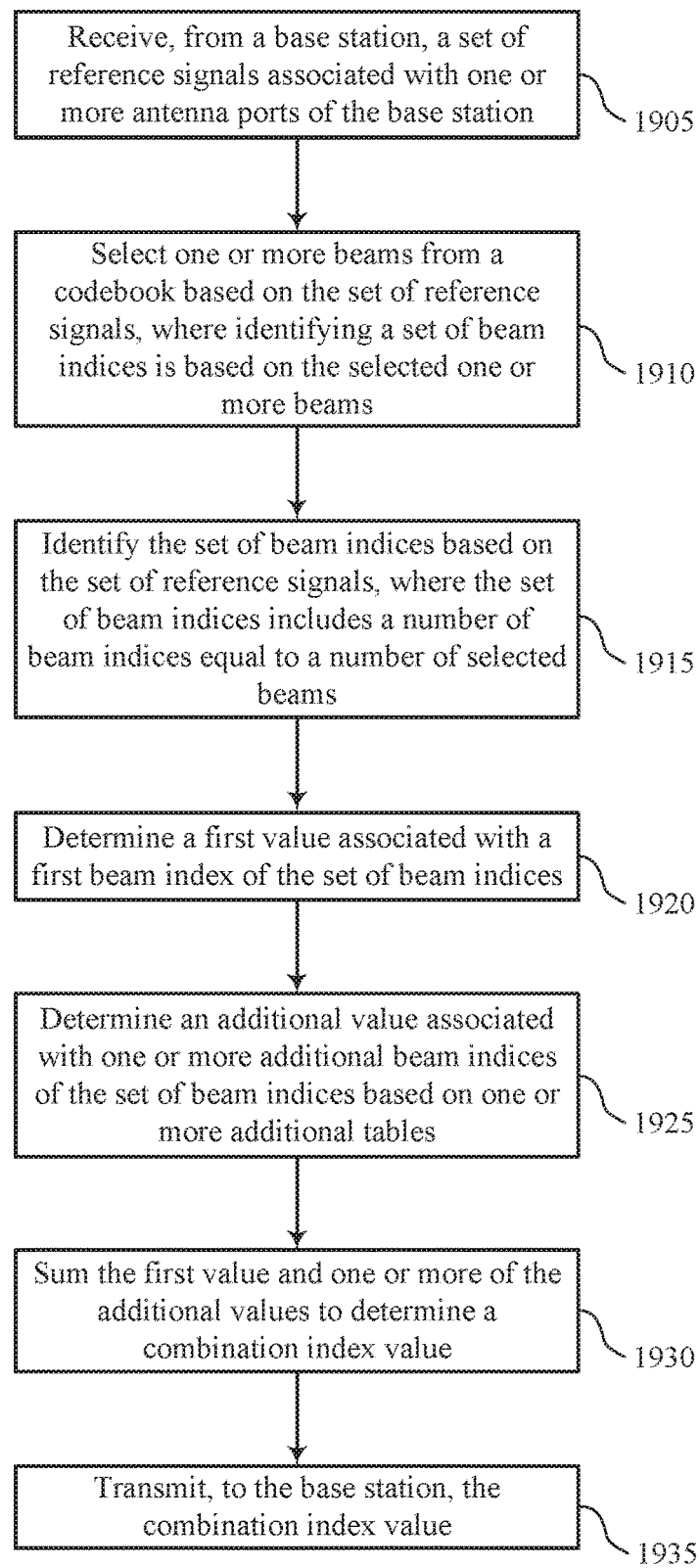

FIG. 19 shows a flowchart illustrating a method 1900 for a scalable process for indicating beam selection in accordance with aspects of the present disclosure. The operations of method 1900 may be implemented by a UE 115 or its components as described herein. For example, the operations of method 1900 may be performed by a UE beam indication module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive, from a base station, a set of reference signals associated with one or more antenna ports of the base station. The operations of block 1905 may be performed according to the methods described herein. In certain examples, aspects of the operations of block 1905 may be performed by a reference signal component as described with reference to FIGS. 7 through 10.

At block 1910 the UE 115 may select one or more beams from a codebook based at least in part on the set of reference signals, wherein identifying a set of beam indices is based at least in part on the selected one or more beams. The operations of block 1910 may be performed according to the methods described herein. In certain examples, aspects of the operations of block 1910 may be performed by a beam selection component as described with reference to FIGS. 7 through 10.

At block 1915 the UE 115 may identify the set of beam indices based at least in part on the set of reference signals, wherein the set of beam indices comprises a number of beam indices equal to a number of selected beams. The operations of block 1915 may be performed according to the methods described herein. In certain examples, aspects of the operations of block 1915 may be performed by a beam index identifier as described with reference to FIGS. 7 through 10.

At block 1920 the UE 115 may determine a first value associated with a first beam index of the set of beam indices. The operations of block 1920 may be performed according to the methods described herein. In certain examples, aspects of the operations of block 1920 may be performed by a value identifier as described with reference to FIGS. 7 through 10.

At block 1925 the UE 115 may determine an additional value associated with one or more additional beam indices of the set of beam indices based at least in part on one or more additional tables. The operations of block 1925 may be performed according to the methods described herein. In certain examples, aspects of the operations of block 1925 may be performed by a value identifier as described with reference to FIGS. 7 through 10.

At block 1930 the UE 115 may sum the first value and one or more of the additional values to determine a combination index value. The operations of block 1930 may be performed according to the methods described herein. In certain examples, aspects of the operations of block 1930 may be performed by a combination index component as described with reference to FIGS. 7 through 10.

At block 1935 the UE 115 may transmit, to the base station, the combination index value. The operations of block 1935 may be performed according to the methods described herein. In certain examples, aspects of the operations of block 1935 may be performed by a combination index component as described with reference to FIGS. 7 through 10.

Figure 20:
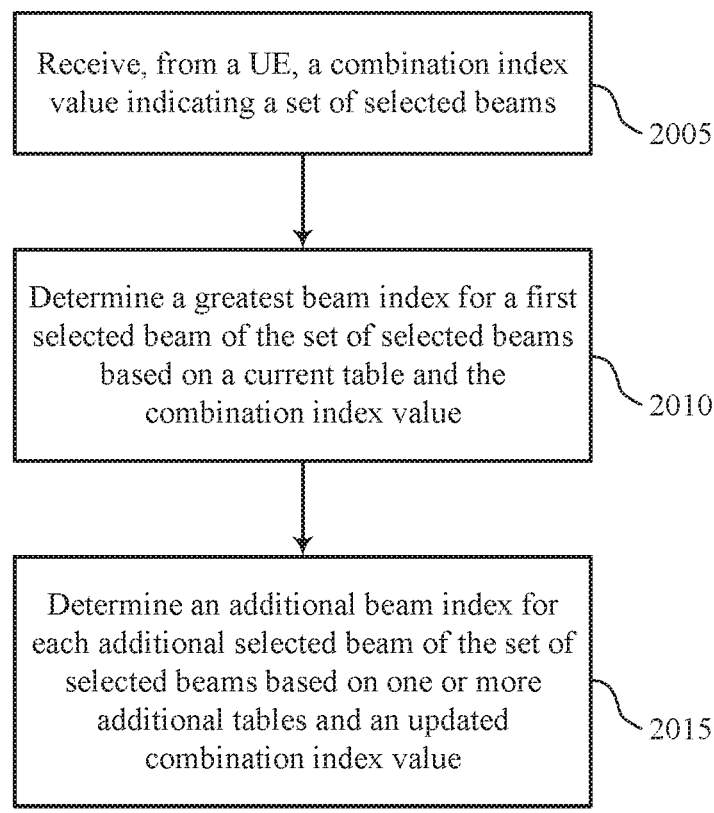

FIG. 20 shows a flowchart illustrating a method 2000 for a scalable process for indicating beam selection in accordance with aspects of the present disclosure. The operations of method 2000 may be implemented by a base station 105 or its components as described herein. For example, the operations of method 2000 may be performed by a base station beam indication module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may receive, from a UE, a combination index value indicating a set of selected beams. The operations of block 2005 may be performed according to the methods described herein. In certain examples, aspects of the operations of block 2005 may be performed by a combination index component as described with reference to FIGS. 11 through 14.

At block 2010 the base station 105 may determine a greatest beam index for a first selected beam of the set of selected beams based at least in part on a current table and the combination index value. The operations of block 2010 may be performed according to the methods described herein. In certain examples, aspects of the operations of block 2010 may be performed by a beam index identifier as described with reference to FIGS. 11 through 14.

At block 2015 the base station 105 may determine an additional beam index for each additional selected beam of the set of selected beams based at least in part on one or more additional tables and an updated combination index value. The operations of block 2015 may be performed according to the methods described herein. In certain examples, aspects of the operations of block 2015 may be performed by a beam index identifier as described with reference to FIGS. 11 through 14.

Figure 21:
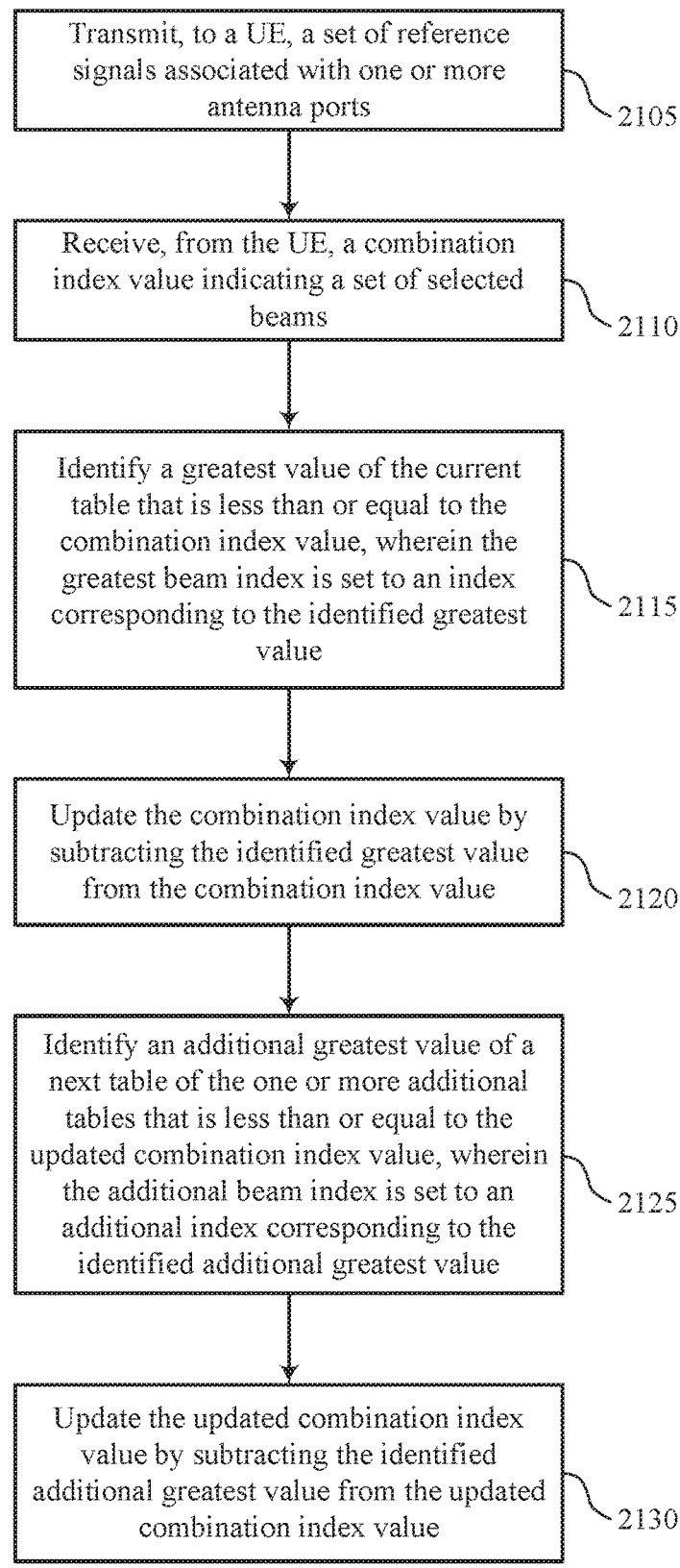

FIG. 21 shows a flowchart illustrating a method 2100 for a scalable process for indicating beam selection in accordance with aspects of the present disclosure. The operations of method 2100 may be implemented by a base station 105 or its components as described herein. For example, the operations of method 2100 may be performed by a base station beam indication module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may transmit, to a UE, a set of reference signals associated with one or more antenna ports. The operations of block 2105 may be performed according to the methods described herein. In certain examples, aspects of the operations of block 2105 may be performed by a reference signal component as described with reference to FIGS. 11 through 14.

At block 2110 the base station 105 may receive, from the UE, a combination index value indicating a set of selected beams. The operations of block 2110 may be performed according to the methods described herein. In certain examples, aspects of the operations of block 2110 may be performed by a combination index component as described with reference to FIGS. 11 through 14.

At block 2115 the base station 105 may identify a greatest value of the current table that is less than or equal to the combination index value, wherein the greatest beam index is set to an index corresponding to the identified greatest value. The operations of block 2115 may be performed according to the methods described herein. In certain examples, aspects of the operations of block 2115 may be performed by an iterative indexing component as described with reference to FIGS. 11 through 14.

At block 2120 the base station 105 may update the combination index value by subtracting the identified greatest value from the combination index value. The operations of block 2120 may be performed according to the methods described herein. In certain examples, aspects of the operations of block 2120 may be performed by an iterative indexing component as described with reference to FIGS. 11 through 14.

At block 2125 the base station 105 may identify an additional greatest value of a next table of the one or more additional tables that is less than or equal to the updated combination index value, wherein the additional beam index is set to an additional index corresponding to the identified additional greatest value. The operations of block 2125 may be performed according to the methods described herein. In certain examples, aspects of the operations of block 2125 may be performed by an iterative indexing component as described with reference to FIGS. 11 through 14.

At block 2130 the base station 105 may update the updated combination index value by subtracting the identified additional greatest value from the updated combination index value. The operations of block 2130 may be performed according to the methods described herein. In certain examples, aspects of the operations of block 2130 may be performed by an iterative indexing component as described with reference to FIGS. 11 through 14.

Figure 22:
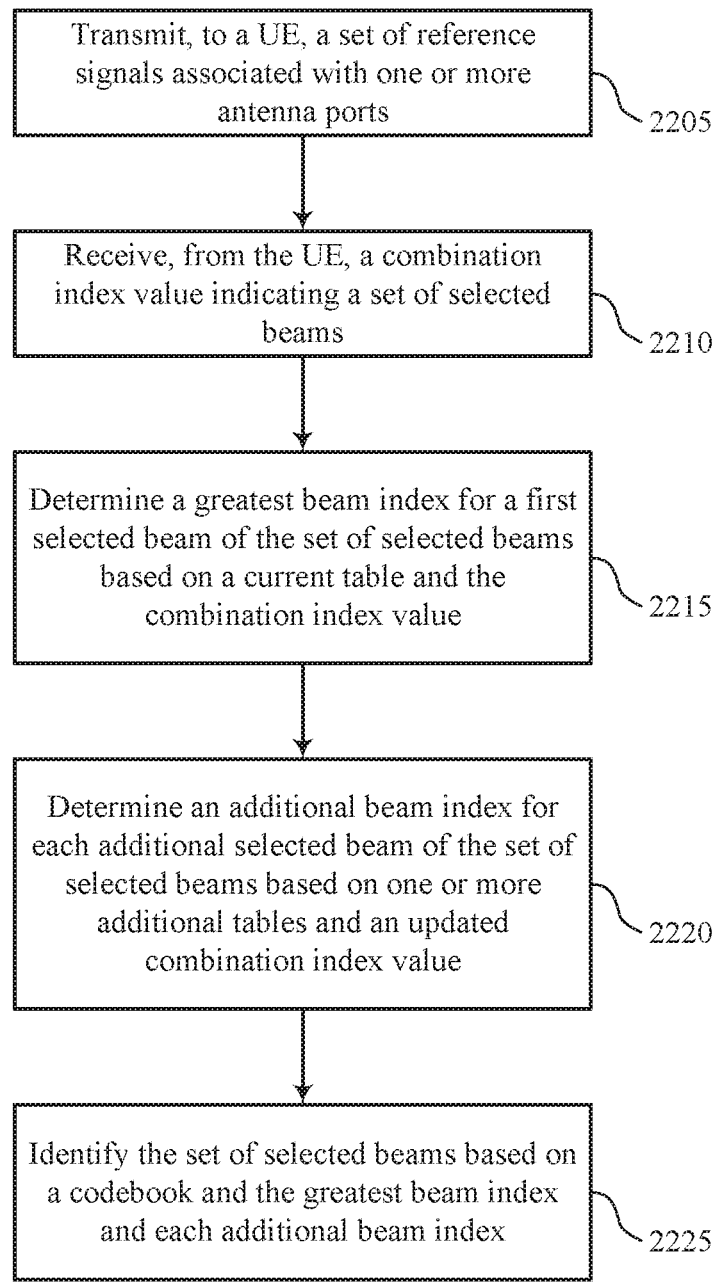

FIG. 22 shows a flowchart illustrating a method 2200 for a scalable process for indicating beam selection in accordance with aspects of the present disclosure. The operations of method 2200 may be implemented by a base station 105 or its components as described herein. For example, the operations of method 2200 may be performed by a base station beam indication module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2205 the base station 105 may transmit, to a UE, a set of reference signals associated with one or more antenna ports. The operations of block 2205 may be performed according to the methods described herein. In certain examples, aspects of the operations of block 2205 may be performed by a reference signal component as described with reference to FIGS. 11 through 14.

At block 2210 the base station 105 may receive, from the UE, a combination index value indicating a set of selected beams. The operations of block 2210 may be performed according to the methods described herein. In certain examples, aspects of the operations of block 2210 may be performed by a combination index component as described with reference to FIGS. 11 through 14.

At block 2215 the base station 105 may determine a greatest beam index for a first selected beam of the set of selected beams based at least in part on a current table and the combination index value. The operations of block 2215 may be performed according to the methods described herein. In certain examples, aspects of the operations of block 2215 may be performed by a beam index identifier as described with reference to FIGS. 11 through 14.

At block 2220 the base station 105 may determine an additional beam index for each additional selected beam of the set of selected beams based at least in part on one or more additional tables and an updated combination index value. The operations of block 2220 may be performed according to the methods described herein. In certain examples, aspects of the operations of block 2220 may be performed by a beam index identifier as described with reference to FIGS. 11 through 14.

At block 2225 the base station 105 may identify the set of selected beams based at least in part on a codebook and the greatest beam index and each additional beam index. The operations of block 2225 may be performed according to the methods described herein. In certain examples, aspects of the operations of block 2225 may be performed by a beam selection component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 IX, IX, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a set of selected beams for reporting to a base station;
   determining a first value associated with a first beam index of a set of beam indices, the first value corresponding to a first index value of a first table, wherein the set of beam indices comprises a number of beam indices equal to a number of selected beams of the set of selected beams;
   determining one or more additional values associated with one or more additional beam indices of the set of beam indices based at least in part on one or more additional tables;
   summing the first value and the one or more additional values to determine a combination index value, wherein the combination index value is a single integer uniquely indicating the first beam index and the one or more additional beam indices; and
   transmitting, to the base station, the combination index value indicating the set of selected beams.

2. The method of claim 1, further comprising:
   receiving a configuration of a codebook type for a codebook for reporting channel state information;
   receiving, from the base station, a set of reference signals associated with one or more antenna ports of the base station; and
   identifying the set of beam indices based at least in part on the codebook type and at least one of the set of reference signals or the one or more antenna ports.

3. The method of claim 2, wherein the identified set of beam indices correspond to codeword indices of the codebook if the configured codebook type comprises a beam selection codebook or to antenna port indices if the configured codebook type comprises a port selection codebook.

4. The method of claim 3, wherein:
   each codeword of the beam selection codebook comprises a base sequence; and
   the beam selection codebook comprises one or more sets of orthogonal base sequences.

5. The method of claim 1, wherein a set of values stored in each of the one or more additional tables is based at least in part on a preceding set of values stored in a preceding table of the first table or the one or more additional tables.

6. The method of claim 5, wherein a value of the set of values is the sum of a preceding value of the set of values and a preceding table value of the preceding set of values, wherein the preceding value and the preceding table value is associated with a same beam index.

7. The method of claim 1, wherein each table of the first table and the one or more additional tables has a same length and wherein a number of active entries for each table is based at least in part on a configured number of antenna ports, a configured number of beams, or a combination thereof.

8. The method of claim 1, further comprising:
receiving a first configuration from the base station indicating a first configured number of antenna ports, configured number of beams, or combination thereof; and
selecting a first set of active entries for each table of the first table and the one or more additional tables based at least in part on the first configured number of antenna ports, configured number of beams, or combination thereof.

9. The method of claim 8, further comprising:
receiving a second configuration from the base station indicating a second configured number of antenna ports, configured number of beams, or combination thereof wherein the second configured number of antenna ports, configured number of beams, or combination thereof is greater than the first configured number of antenna ports, configured number of beams, or combination thereof; and
selecting a second set of active entries for each table of the first table and the one or more additional tables based at least in part on the second configured number of antenna ports, configured number of beams, or combination thereof, wherein the first set of active entries is a subset of the second set of active entries.

10. The method of claim 1, wherein a number of active entries is based at least in part on a configured number of antenna ports transmitting channel state information reference signals, a configured number of beams, or a combination thereof.

11. The method of claim 1, further comprising:
receiving a configuration from the base station indicating a configured number of beams for selection, wherein the number of selected beams equals the configured number of beams for selection; and
selecting the set of beam indices based at least in part on the configured number of beams for selection.

12. The method of claim 11, further comprising:
receiving a first configuration from the base station indicating the configured number of beams for selection; and
selecting a first set of tables comprising a number of tables equal to the configured number of beams for selection, wherein determining the first value and the one or more additional values is based at least in part on the first set of tables.

13. The method of claim 12, further comprising:
receiving a second configuration from the base station indicating a second configured number of beams for selection that is greater than the configured number of beams for selection; and
selecting a second set of tables comprising a second number of tables equal to the second configured number of beams for selection, wherein the first set of tables is a subset of the second set of tables.

14. The method of claim 1, wherein the first value is equal to the first beam index.

15. The method of claim 1, wherein each additional beam index of the set of beam indices increases in an ascending order with respect to a previous additional beam index.

16. The method of claim 1, wherein a first additional value of the one or more additional values is based at least in part on a current table of the one or more additional tables.

17. The method of claim 16, further comprising:
identifying, from the current table, an input value associated with an additional beam index of the set of beam indices, wherein the first additional value is equal to the input value.

18. The method of claim 1, wherein a first additional value of the one or more additional values is based at least in part on a preceding table and a current table of the one or more additional tables.

19. The method of claim 18, further comprising:
identifying a preceding beam index that is one less than an additional beam index of the set of beam indices;
identifying, from the preceding table, a first input value associated with the preceding beam index;
identifying, from the current table, a second input value associated with the preceding beam index; and
summing the first input value and the second input value to obtain the first additional value for the additional beam index.

20. The method of claim 1, further comprising:
identifying a beam index of the set of beam indices, wherein identifying the beam index comprises:
identifying a first sub-beam index corresponding to a first dimension;
identifying a second sub-beam index corresponding to a second dimension; and
calculating the beam index based at least in part on the first sub-beam index and the second sub-beam index.

21. The method of claim 20, wherein calculating the beam index further comprises:
multiplying the first sub-beam index with a size of the second dimension to obtain an intermediate value; and
adding, to the intermediate value, the second sub-beam index to obtain the beam index.

22. The method of claim 2, further comprising:
selecting one or more beams from the codebook based at least in part on the set of reference signals, wherein identifying the set of beam indices is based at least in part on the selected one or more beams.

23. The method of claim 22, wherein the codebook used for the selecting is based at least in part on a configuration of a number of antenna ports.

24. An apparatus for wireless communication, comprising:
means for identifying a set of selected beams for reporting to a base station;
means for determining a first value associated with a first beam index of a set of beam indices, the first value corresponding to a first index of a first table, wherein the set of beam indices comprises a number of beam indices equal to a number of selected beams of the set of selected beams;
means for determining one or more additional values associated with one or more additional beam indices of the set of beam indices based at least in part on one or more additional tables;

means for summing the first value and the one or more additional values to determine a combination index value, wherein the combination index value is a single integer uniquely indicating the first beam index and the one or more additional beam indices; and means for transmitting, to the base station, the combination index value indicating the set of selected beams.

25. The apparatus of claim 24, further comprising:

means for receiving a configuration of a codebook type for a codebook for reporting channel state information;

means for receiving, from the base station, a set of reference signals associated with one or more antenna ports of the base station; and means for identifying the set of beam indices based at least in part on the codebook type and at least one of the set of reference signals or the one or more antenna ports.

26. The apparatus of claim 25, wherein the identified set of beam indices correspond to codeword indices of the codebook if the configured codebook type comprises a beam selection codebook or to antenna port indices if the configured codebook type comprises a port selection codebook.

27. The apparatus of claim 24, wherein a set of values stored in each of the one or more additional tables is based at least in part on a preceding set of values stored in a preceding table of the first table or the one or more additional tables.

28. The apparatus of claim 27, wherein a value of the set of values is the sum of a preceding value of the set of values and a preceding table value of the preceding set of values, wherein the preceding value and the preceding table value is associated with a same beam index.

29. The apparatus of claim 24, wherein each table of the first table and the one or more additional tables has a same length and wherein a number of active entries for each table is based at least in part on a configured number of antenna ports, a configured number of beams, or a combination thereof.

30. The apparatus of claim 24, further comprising:

means for receiving a first configuration from the base station indicating a first configured number of antenna ports, configured number of beams, or combination thereof; and means for selecting a first set of active entries for each table of the first table and the one or more additional tables based at least in part on the first configured number of antenna ports, configured number of beams, or combination thereof.

31. The apparatus of claim 30, further comprising:

means for receiving a second configuration from the base station indicating a second configured number of antenna ports, configured number of beams, or combination thereof, wherein the second configured number of antenna ports, configured number of beams, or combination thereof is greater than the first configured number of antenna ports, configured number of beams, or combination thereof; and means for selecting a second set of active entries for each table of the first table and the one or more additional tables based at least in part on the second configured number of antenna ports, configured number of beams, or combination thereof, wherein the first set of active entries is a subset of the second set of active entries.

32. The apparatus of claim 24, further comprising:

means for receiving a configuration from the base station indicating a configured number of beams for selection, wherein the number of selected beams equals the configured number of beams for selection; and means for selecting the set of beam indices based at least in part on the configured number of beams for selection.

33. The apparatus of claim 32, further comprising:

means for receiving a first configuration from the base station indicating the configured number of beams for selection; and means for selecting a first set of tables comprising a number of tables equal to the configured number of beams for selection, wherein determining the first value and the one or more additional values is based at least in part on the first set of tables.

34. The apparatus of claim 33, further comprising:

means for receiving a second configuration from the base station indicating a second configured number of beams for selection that is greater than the configured number of beams for selection; and means for selecting a second set of tables comprising a second number of tables equal to the second configured number of beams for selection, wherein the first set of tables is a subset of the second set of tables.

35. The apparatus of claim 24, further comprising:

means for identifying a beam index of the set of beam indices, wherein the means for identifying the beam index further comprise:

means for identifying a first sub-beam index corresponding to a first dimension;

means for identifying a second sub-beam index corresponding to a second dimension; and means for calculating the beam index based at least in part on the first sub-beam index and the second sub-beam index.

36. The apparatus of claim 35, further comprising:

means for multiplying the first sub-beam index with a size of the second dimension to obtain an intermediate value; and means for adding, to the intermediate value, the second sub-beam index to obtain the beam index.

37. An apparatus for wireless communication, comprising:

a processor;

memory in electronic communication with the processor; and instructions stored in the memory and operable, when executed by the processor, to cause the apparatus to:

identify a set of selected beams for reporting to a base station;

determine a first value associated with a first beam index of a set of beam indices, the first value corresponding to a first index value of a first table, wherein the set of beam indices comprises a number of beam indices equal to a number of selected beams of the set of selected beams;

determine one or more additional values associated with one or more additional beam indices of the set of beam indices based at least in part on one or more additional tables;

sum the first value and the one or more additional values to determine a combination index value, wherein the combination index value is a single integer uniquely indicating the first beam index and the one or more additional beam indices; and transmit, to the base station, the combination index value indicating the set of selected beams.

38. A non-transitory computer readable medium storing code for wireless communication, the code comprising instructions executable by a processor to:
- identify a set of selected beams for reporting to a base station;
- determine a first value associated with a first beam index of a set of beam indices, the first value corresponding to a first index value of a first table, wherein the set of beam indices comprises a number of beam indices equal to a number of selected beams of the set of selected beams;
- determine one or more additional values associated with one or more additional beam indices of the set of beam indices based at least in part on one or more additional tables;
- sum the first value and the one or more additional values to determine a combination index value, wherein the combination index value is a single integer uniquely indicating the first beam index and the one or more additional beam indices; and
- transmit, to the base station, the combination index value indicating the set of selected beams.

* * * * *